United States Patent
Yamada

(10) Patent No.: US 12,540,853 B2
(45) Date of Patent: Feb. 3, 2026

(54) OPTICAL DEVICE AND SPECTROMETER

(71) Applicant: SEIKO EPSON CORPORATION, Tokyo (JP)

(72) Inventor: Kohei Yamada, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 371 days.

(21) Appl. No.: 18/365,294

(22) Filed: Aug. 4, 2023

(65) Prior Publication Data
US 2024/0045199 A1 Feb. 8, 2024

(30) Foreign Application Priority Data
Aug. 5, 2022 (JP) .................. 2022-125348

(51) Int. Cl.
*G01J 3/453* (2006.01)
*G01B 9/02001* (2022.01)
(Continued)

(52) U.S. Cl.
CPC .......... *G01J 3/4535* (2013.01); *G01J 3/0229* (2013.01); *G02B 27/1026* (2013.01);
(Continued)

(58) Field of Classification Search
CPC .................. G01J 3/4535; G01J 3/0229; G01J 2003/4534; G01J 3/4532; G02B 27/1026;
(Continued)

(56) References Cited

U.S. PATENT DOCUMENTS 5,546,185 A * 8/1996 Okumura .............. G01J 3/4535
356/452
6,025,913 A  2/2000 Curbelo
(Continued)

FOREIGN PATENT DOCUMENTS

JP  S59-228133 A  12/1984
JP  2001-517774 A  10/2001
(Continued)

*Primary Examiner* — Tarifur R Chowdhury
*Assistant Examiner* — Kaitlyn E Kidwell
(74) *Attorney, Agent, or Firm* — Harness, Dickey & Pierce, P.L.C.

(57) ABSTRACT

An optical device includes: a second light source configured to emit laser light having a wavelength different from that of measurement light emitted from a first light source; a light splitter; a first mirror configured to add a first modulation signal to the measurement light and add a displacement signal to the laser light; a second mirror configured to reflect a second beam of the measurement light; a first color separator configured to separate the second beam of the measurement light from a second laser light beam based on a difference in wavelength; an optical modulator driven based on a drive signal and configured to add a second modulation signal to the second laser light beam after the separation; a first photodetector configured to receive the measurement light including a sample-derived signal and the first modulation signal; and a second photodetector configured to receive the laser light including the displacement signal and the second modulation signal.

18 Claims, 14 Drawing Sheets

(51) Int. Cl.
  *G01J 3/02* (2006.01)
  *G02B 26/08* (2006.01)
  *G02B 27/10* (2006.01)
(52) U.S. Cl.
  CPC ... *G01B 9/02007* (2013.01); *G01J 2003/4534* (2013.01); *G02B 26/0833* (2013.01)
(58) Field of Classification Search
  CPC ............ G02B 26/0833; G01B 9/02007; G01B 9/02027
  See application file for complete search history.

(56) References Cited

U.S. PATENT DOCUMENTS

2007/0206201 A1* 9/2007 de Groot ............ G01B 9/02011
                                                              356/512
2020/0124472 A1  4/2020 Suzuki et al.
2022/0065614 A1* 3/2022 Yamada .................. G01P 3/366

FOREIGN PATENT DOCUMENTS

| JP | 2006-300664 A | 11/2006 |
| JP | 2014-182076 A | 9/2014 |
| JP | 2016-142527 A | 8/2016 |
| JP | 2020-129116 A | 8/2020 |

* cited by examiner

OPTICAL DEVICE AND SPECTROMETER

The present application is based on, and claims priority from JP Application Serial Number 2022-125348, filed Aug. 5, 2022, the disclosure of which is hereby incorporated by reference herein in its entirety.

BACKGROUND

1. Technical Field

The present disclosure relates to an optical device and a spectrometer.

2. Related Art

JP-A-2020-129116 discloses an optical device used for spectroscopic analysis in which spectral information of light emitted or absorbed by a sample is acquired, and components and the like in the sample are analyzed based on the spectral information. The optical device includes a mirror unit, a beam splitter unit, a first light detector, a second light source, and a second light detector. The mirror unit includes a movable mirror that moves along a predetermined direction and a fixed mirror whose position is fixed. In such an optical device, the beam splitter unit, the movable mirror, and the fixed mirror constitute an interference optical system that measurement light and laser light separately enter.

The measurement light emitted from a first light source and passing through an object to be measured is split by the beam splitter unit. One part of the measurement light after splitting is reflected by the movable mirror and returns to the beam splitter unit. The other part of the measurement light after splitting is reflected by the fixed mirror and returns to the beam splitter unit. The one part and the other part of the measurement light returned to the beam splitter unit are detected as interference light by the first light detector.

On the other hand, laser light emitted from the second light source is split by the beam splitter unit. One part of the laser light after splitting is reflected by the movable mirror and returns to the beam splitter unit. The other part of the laser light after splitting is reflected by the fixed mirror and returns to the beam splitter unit. The one part and the other part of the laser light returned to the beam splitter unit are detected as interference light by the second light detector.

In such an optical device, a position of the movable mirror can be measured based on a detection result of the interference light of the laser light. Based on a measurement result of the position of the movable mirror and a detection result of the interference light of the measurement light, spectroscopic analysis can be performed on the object to be measured. Specifically, a waveform called an interferogram is obtained by obtaining intensities of the measurement light at respective positions of the movable mirror. By subjecting the interferogram to Fourier transform, spectral information of the object to be measured can be obtained.

In the optical device disclosed in JP-A-2020-129116, the position of the movable mirror can be detected based on a change in intensity of the interference light of the laser light. Specifically, when the intensity of the interference light of the laser light takes a feature point such as a maximum value or a minimum value, the position of the movable mirror is specified based on the feature point.

However, with a restriction that an interval between the feature points depends on a wavelength of the laser light, a minimum interval is ¼ of the wavelength. Therefore, when an intensity change of the laser light is used as a trigger, it is difficult to sample the intensity of the measurement light at sufficiently short intervals. When the sampling interval of the intensity of the measurement light cannot be shortened, resolution of the interferogram decreases. As a result, resolution of the spectral information subjected to Fourier transform cannot be sufficiently enhanced.

The sampling interval of the intensity of the measurement light affects a range of wavenumbers and wavelengths from which the spectral information can be obtained. For this reason, sufficient widening of a band of the measurement light, which is a countermeasure for short-wavelength measurement light, cannot be achieved.

SUMMARY

An optical device according to an application example of the present disclosure includes: a second light source configured to emit laser light having a wavelength different from that of measurement light emitted from a first light source; a light splitter configured to split the measurement light into first beam of the measurement light and the second beam of the measurement light and then mix the first beam of the measurement light and the second beam of the measurement light, and configured to split the laser light into first laser light beam and the second laser light beam and then mix the first laser light beam and the second laser light beam; a first mirror configured to move with respect to the light splitter, and reflect the first beam of the measurement light and the first laser light beam, thereby adding a first modulation signal to the first beam of the measurement light and adding a displacement signal to the first laser light beam; a second mirror configured to reflect the second beam of the measurement light; a first color separator configured to separate the second beam of the measurement light from the second laser light beam based on a difference in wavelength; an optical modulator driven based on a drive signal and configured to add a second modulation signal to the second laser light beam after separation by the first color separator; a first photodetector configured to receive the measurement light including the first modulation signal and a sample-derived signal that is generated by interaction between the measurement light and a sample, and to output a first light reception signal; and a second photodetector configured to receive the laser light including the displacement signal and the second modulation signal and to output a second light reception signal.

A spectrometer according to an application example of the present disclosure includes: the optical device according to the application example of the present disclosure; a signal generator configured to output the drive signal and a reference signal; a mirror position calculator configured to perform calculation on the second light reception signal based on the reference signal to generate a mirror position signal indicating a position of the first mirror; a measurement light intensity calculator configured to generate a waveform representing intensities of the first light reception signal at respective positions of the first mirror based on the first light reception signal and the mirror position signal; and a Fourier transformer configured to perform Fourier transform on the waveform to acquire spectral information.

DESCRIPTION OF EMBODIMENTS

Hereinafter, an optical device and a spectrometer according to the present disclosure will be described in detail based on embodiments illustrated in the accompanying drawings.

1. First Embodiment

First, an optical device and a spectrometer according to a first embodiment will be described.

Figure 1:
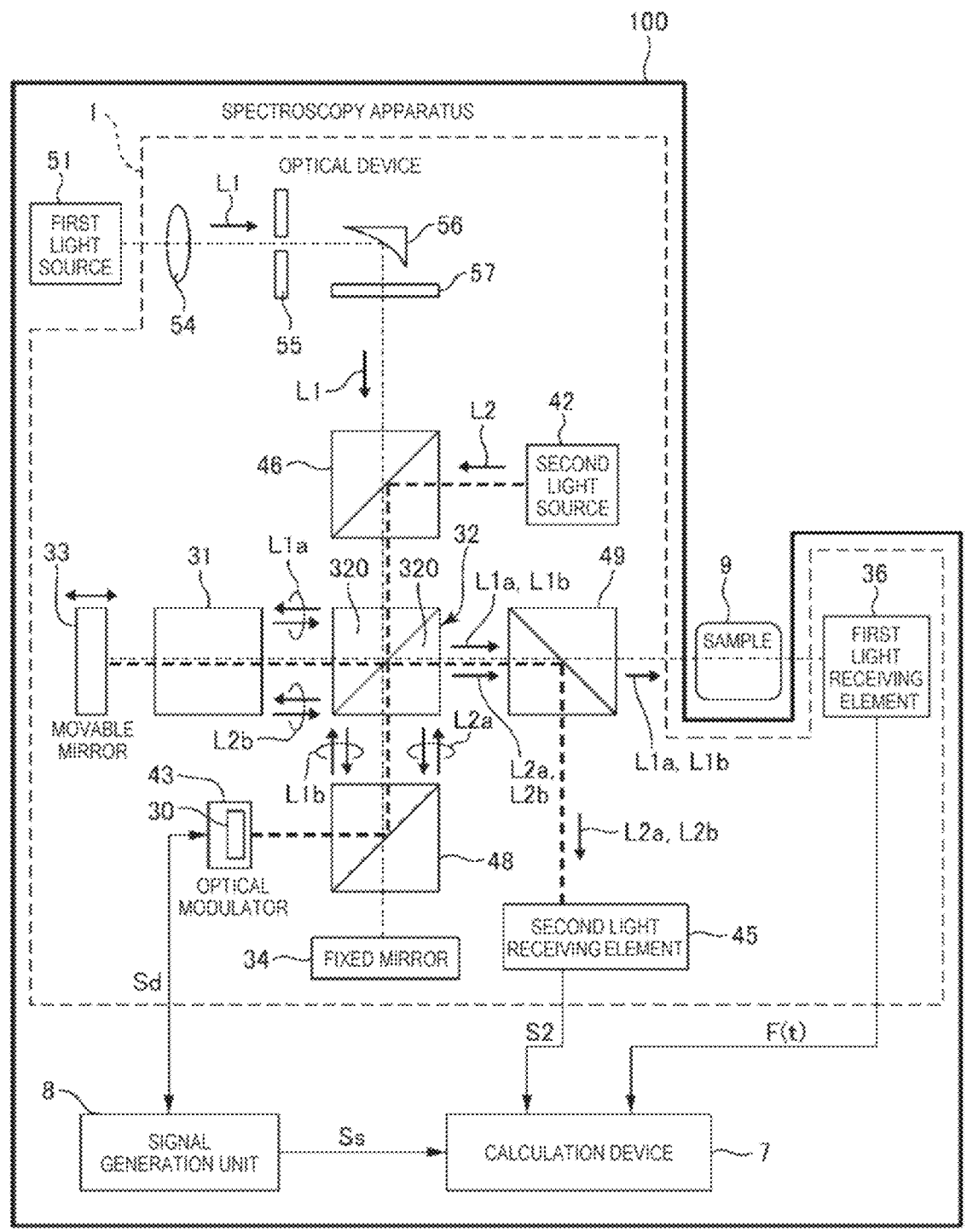
FIG. 1 is a schematic configuration diagram illustrating a schematic configuration of a spectrometer according to a first embodiment.

FIG. 1 is a schematic configuration diagram illustrating a schematic configuration of the spectrometer according to the first embodiment.

In a spectrometer 100 illustrated in FIG. 1, after measurement light L1 is passed through a Michelson interference optical system, a sample 9, which is a test body, is irradiated with the measurement light L1, and a change in intensity of the measurement light emitted from the sample 9 is detected, thereby acquiring an interferogram. Spectral information is obtained by subjecting the obtained interferogram to Fourier transform. By selecting a wavelength of the measurement light L1, the spectrometer 100 illustrated in FIG. 1 can be applied to, for example, infrared spectroscopic analysis, visible light spectroscopic analysis, ultraviolet spectroscopic analysis, or the like for the sample 9.

The spectrometer 100 includes an optical device 1, a signal generator 8, and a calculation device 7.

The measurement light L1 emitted from a first light source 51 is incident on the optical device 1. In the optical device 1 illustrated in FIG. 1, after the measurement light L1 is divided into two light beams, one light beam is reflected by a movable mirror, and the other light beam is reflected by a fixed mirror. Then, the reflected light is mixed again, and the mixed light is passed through the sample 9 and is made incident on a photodetector, thereby acquiring an intensity of obtained interference light.

The "measurement light" in the present specification refers to the light emitted from the first light source 51, light emitted from the sample 9 by reaction therewith after the light emitted from the first light source 51 is irradiated to the sample 9, or the interference light obtained by dividing the light emitted from the first light source 51 and then causing the divided measurement light to interfere with each other. Among these, the light emitted from the sample 9 by reaction therewith refers to transmitted light that underwent absorption by the sample 9 after the sample 9 is irradiated with the interference light described above in the case of the present embodiment.

The light emitted from the sample 9 by reaction therewith may be reflected light from the sample 9. Further, in an embodiment to be described later, examples of the light emitted from the sample 9 by reaction therewith include Raman scattered light emitted from the sample 9 by Raman scattering after the sample 9 is irradiated with the measurement light, and fluorescence emitted from the sample 9 after the sample 9 is irradiated with the measurement light.

The signal generator 8 has a function of outputting a drive signal Sd to an optical modulator 43 of the optical device 1 and a function of outputting a reference signal Ss toward the calculation device 7.

The calculation device 7 has a function of obtaining a waveform representing intensities of interference light at respective positions of the movable mirror, that is, an interferogram, based on a signal indicating the intensities of the interference light output from the optical device 1 and a signal indicating the position of the movable mirror, and a function of performing Fourier transform on the waveform to acquire spectral information.

Hereinafter, configurations of units of the spectrometer 100 will be described in order.

1.1. Optical Device

The optical device 1 illustrated in FIG. 1 is a Michelson interference optical system, and includes a beam splitter 32 (light splitter), a movable mirror 33 (first mirror), a fixed mirror 34 (second mirror), and a first photodetector 36. In addition to the above-described optical components, the optical device 1 further includes a condensing lens 54, an aperture 55, a curved mirror 56, a cut filter 57, a dichroic mirror 48 (first color separator), a dichroic mirror 49 (second color separator), a dichroic mirror 46 (third color separator), a wavelength dispersion compensation plate 31, a second light source 42, and the optical modulator 43. A part of these optical components may be provided as necessary, or may be omitted. In addition, the optical device 1 may include optical components other than those described above, or the above-described optical components may be replaced by other optical components having equivalent functions.

The condensing lens 54 condenses the measurement light L1 emitted from the first light source 51, and passes the condensed measurement light L1 through the aperture 55 at a light condensing position thereof. The curved mirror 56 converts divergent light into parallel light and changes an optical path thereof. The cut filter 57 cuts off light except light in a target wavelength range.

Although the optical device 1 according to the embodiment does not include the first light source 51, the optical device of the present invention may include the first light source 51. For example, when a small-sized light source such as a semiconductor laser is used as the first light source 51 as in the embodiment to be described later, there is an advantage that it is possible to implement a spectrometer without impairing size reduction in which there are less connection portions between the optical components than when the first light source 51 is provided outside the optical device 1.

The first light source 51 is a light source that emits, for example, white light, that is, light in which light having wide wavelength ranges gathers, as the measurement light L1. A wavelength range of the measurement light L1, that is, a type of the first light source 51 is appropriately selected according to a purpose of spectroscopic analysis to be performed on the sample 9. When the infrared spectroscopic analysis is to be performed, for example, a halogen lamp, an infrared lamp, a tungsten lamp, or the like may be used as the first light source 51. When the visible light spectroscopic analysis is to be performed, for example, a halogen lamp or the like may be used as the first light source 51. When the ultraviolet spectroscopic analysis is to be performed, for example, a deuterium lamp, an ultraviolet light emitting diode (UV-LED), or the like may be used as the first light source 51.

By selecting a wavelength of 100 nm or more and less than 760 nm as the wavelength of the measurement light L1, it is possible to implement a spectrometer 100 capable of performing the ultraviolet spectroscopic analysis or the visible light spectroscopic analysis. In addition, by selecting a wavelength of 760 nm or more and 20 μm or less as the wavelength of the measurement light L1, it is possible to implement a spectrometer 100 capable of performing the infrared spectroscopic analysis or near-infrared spectroscopic analysis. Furthermore, by selecting a wavelength of 30 μm or more and 3 mm or less as the wavelength of the measurement light L1, it is possible to implement a spectrometer 100 capable of performing terahertz wave spectroscopic analysis.

The second light source 42 is a light source that emits laser light L2 having coherence. Examples of the second light source 42 include a gas laser such as a He-Ne laser, and a semiconductor laser element such as a distributed feedback-laser diode (DFB-LD), a fiber Bragg grating laser diode (FBG-LD), a vertical cavity surface emitting laser diode (VCSEL) diode, and a Fabry-Perot laser diode (FP-LD).

The second light source 42 is particularly preferably a semiconductor laser element. Accordingly, a size of the second light source 42 can be particularly reduced, and size reduction and weight reduction of the optical device 1 can be achieved.

The measurement light L1 and the laser light L2 have different wavelengths from each other. The different wavelengths mean that a spectrum center wavelength±a half-value width of the measurement light L1 and a spectrum center wavelength±a half-value width of the laser light L2 are shifted from each other. Accordingly, in the optical device 1, the measurement light L1 and the laser light L2 can be separated and synthesized with high accuracy in the dichroic mirrors 46, 48, and 49.

The dichroic mirror 46 has a function of transmitting the measurement light L1 and reflecting the laser light L2. With this function, the dichroic mirror 46 synthesizes the measurement light L1 and the laser light L2.

Examples of the type of the dichroic mirror 46 include a plate element in addition to a prism element (cube element) illustrated in FIG. 1.

The beam splitter 32 is a non-polarization beam splitter that splits the incident measurement light L1 into two beams of measurement light L1a and L1b and splits the incident laser light L2 into two beams of laser light L2a and L2b. Specifically, the beam splitter 32 reflects a part of the measurement light L1 toward the movable mirror 33 as the measurement light L1a, and transmits the other part of the measurement light L1 toward the fixed mirror 34 as the measurement light L1b, thereby splitting the measurement light L1 into two, that is, first beam of the measurement light L1a and the second beam of the measurement light L1b.

The beam splitter 32 reflects a part of the incident laser light L2 toward the movable mirror 33 as the laser light L2b, and transmits the other part of the laser light L2 toward the optical modulator 43 as the laser light L2a. Accordingly, the beam splitter 32 splits the laser light L2 into two, that is, first laser light beam L2b and the second laser light beam L2a.

Examples of the type of the beam splitter 32 include a prism element (cube element) and a plate element. When a beam splitter 32 of a plate type is used, since wavelength dispersion occurs between the measurement light L1a and the measurement light L1b, a wavelength dispersion compensation plate may be disposed between the beam splitter 32 and the fixed mirror 34 as necessary. In the embodiment, since a prism element is used as the beam splitter 32, the wavelength dispersion compensation plate is not necessary. The beam splitter 32 illustrated in FIG. 1 includes two prisms 320 and 320, and an optical thin film (not shown) sandwiched between the prisms 320. In such a prism element, since the optical thin film is not exposed, weather resistance of the optical thin film is excellent. Therefore, by using the prism element, it is possible to enhance long-term reliability of the beam splitter 32 as compared with a case where the plate element is used.

The beam splitter 32 transmits the measurement light L1a reflected by the movable mirror 33 toward the first photodetector 36, and reflects the measurement light L1b reflected by the fixed mirror 34 toward the first photodetector 36. Therefore, the beam splitter 32 has a function of mixing the split beams of the measurement light L1a and L1b. Further, the beam splitter 32 transmits the laser light L2b reflected by the movable mirror 33 toward the dichroic mirror 49, and reflects the laser light L2a reflected by the optical modulator 43 toward the dichroic mirror 49. Therefore, the beam splitter 32 has a function of mixing the split beams of the laser light L2a and L2b.

The movable mirror 33 is a mirror that moves in an incident direction of the measurement light L1a with respect to the beam splitter 32 and reflects the measurement light L1a and the laser light L2b. The measurement light L1a reflected by the movable mirror 33 includes displacement information corresponding to a position of the movable mirror 33. Therefore, the movable mirror 33 adds a first modulation signal to the measurement light L1a. The laser light L2b reflected by the movable mirror 33 includes the displacement information corresponding to the position of the movable mirror 33. Therefore, the movable mirror 33 adds a displacement signal of the movable mirror 33 to the laser light L2b.

A moving mechanism (not shown) configured to move the movable mirror 33 is not particularly limited, and examples thereof include a uniaxial linear stage, a piezo drive device, and a micro-actuator using a micro electro mechanical system (MEMS) technique. Among them, the uniaxial linear stage includes, for example, a voice coil motor (VCM) or a ball screw drive unit and a linear guide mechanism, and accordingly it is possible to achieve good translation in the movement of the movable mirror 33.

The fixed mirror 34 is a mirror whose position is fixed with respect to the beam splitter 32 and reflects the measurement light L1b. The measurement light L1b reflected by the fixed mirror 34 is mixed with the measurement light L1a by the beam splitter 32, and is received by the first photodetector 36 as interference light. In the optical device 1, an optical path difference occurs between an optical path of the measurement light L1a and an optical path of the measurement light L1b according to the position of the movable mirror 33. Therefore, an interference state of the interference light changes according to the position of the movable mirror 33. The laser light L2a reflected by the optical modulator 43 is mixed with the laser light L2b by the beam splitter 32, is incident on the dichroic mirror 49 as interference light, is reflected, and is received by a second photodetector 45. In the optical device 1, the position of the movable mirror 33 is detected by a laser interferometer technique. Specifically, two beams of light having slightly different frequencies are caused to interfere with each other, and phase information is extracted from the interference light to calculate the position of the movable mirror 33. That is, the displacement information corresponding to the position of the movable mirror 33 is obtained based on the phase information of the interference light. Such a method is called an optical heterodyne interferometry. According to the optical heterodyne interferometry, when the position of the movable mirror 33 is to be specified based on the phase information of the interference light, influence of disturbance, in particular, influence of stray light having a frequency of noise is hardly received, which gives high robustness to the optical device 1.

Each of the movable mirror 33 and the fixed mirror 34 may be a flat plate mirror or a corner cube mirror. A metal coating using a metal such as Al, Au, or Ag, a dielectric multilayer film, or the like may be formed on a reflecting surface of each mirror. In addition, with respect to the movable mirror 33, "movement in the incident direction of the measurement light" includes movement in a direction including a component of the incident direction of the measurement light. Therefore, the movable mirror 33 may move in a direction obliquely inclined with respect to the incident direction (non-parallel direction). In this case, it is sufficient that the calculation device 7 has a function of eliminating the influence of oblique inclination of the movable mirror 33 with respect to the incident direction of the measurement light. Further, the fixed mirror 34 may also be movable. In this case, it is sufficient that the calculation device 7 has a function of eliminating the influence of movement of the fixed mirror 34.

The wavelength dispersion compensation plate 31 is an optical component that is provided between the beam splitter 32 and the movable mirror 33 and compensates for wavelength dispersion caused by a difference in optical path length of a glass material. A constituent material of the wavelength dispersion compensation plate 31 illustrated in FIG. 1 is not particularly limited, but is preferably the same material as a glass material of the dichroic mirror 48. Accordingly, the wavelength dispersion compensation plate 31 can more effectively compensate wavelength dispersion. In this case, a thickness of the wavelength dispersion compensation plate 31 on the optical path of the measurement light L1a is preferably set to be the same as a thickness of the glass material of the dichroic mirror 48 on the optical path of the measurement light L1b. Accordingly, the wavelength dispersion is substantially zero between the measurement light L1a reciprocating between the beam splitter 32 and the movable mirror 33 and the measurement light L1b reciprocating between the beam splitter 32 and the fixed mirror 34. Therefore, it is possible to prevent the wavelength dispersion from eventually affecting the interferogram and the spectral information.

The "same material" as described above refers to a material having a difference in refractive index of about 0.05 or less from that of the glass material. The "same thickness" means that a physical length on the optical path is 10 μm or less.

The dichroic mirror 48 has a function of transmitting the measurement light L1b and reflecting the laser light L2a. With this function, the dichroic mirror 48 separates and synthesizes the measurement light L1b and the laser light L2a. The separated measurement light L1b is reflected by the fixed mirror 34 and returns to the dichroic mirror 48. The separated laser light L2a is reflected by the optical modulator 43 and returns to the dichroic mirror 48. Examples of the type of the dichroic mirror 48 include, in addition to a prism element (cube element) illustrated in FIG. 1, a plate element.

The optical modulator 43 reflects the laser light L2a to shift a frequency thereof. Accordingly, the optical modulator 43 adds a second modulation signal to the laser light L2a.

Examples of a vibrator 30 provided in the optical modulator 43 include a quartz crystal vibrator, a silicon vibrator, a ceramic vibrator, and a piezo element. Among these, the vibrator 30 is preferably a quartz crystal vibrator, a silicon vibrator, or a ceramic vibrator. Unlike other vibrators such as a piezo element, such vibrators are vibrators using a resonance phenomenon, and thus have a high Q value and can easily stabilize a natural frequency.

In addition, the optical modulator 43 including the vibrator 30 can be greatly reduced in volume and weight as compared with an optical modulator in the related art. Therefore, the size reduction, weight reduction, and power consumption reduction of the optical device 1 can be achieved.

Examples of the optical modulator 43 include an optical modulator disclosed in JP-A-2022-38156. In this publication, a quartz crystal AT vibrator is cited as the vibrator 30. Further, as the vibrator 30, an SC-cut quartz crystal vibrator, a tuning fork quartz crystal vibrator, a quartz crystal surface acoustic wave element, or the like may be used.

The silicon vibrator is a vibrator that includes a single crystal silicon piece manufactured from a single crystal silicon substrate by using a micro electro mechanical system (MEMS) technique, and a piezoelectric film. The MEMS refers to a micro electro mechanical system. Examples of a shape of the single crystal silicon piece include a cantilever beam shape of a two-legged tuning fork type and a three-legged tuning fork type, and a both-ends-supported beam shape. An oscillation frequency of the silicon vibrator is, for example, about 1 kHz to several hundreds of MHz.

The ceramic vibrator is a vibrator including a piezoelectric ceramic piece manufactured by sintering a piezoelectric ceramic, and an electrode. Examples of the piezoelectric ceramic include lead zirconate titanate (PZT) and barium titanate (BTO). An oscillation frequency of the ceramic vibrator is, for example, about several hundreds of kHz to several tens of MHz.

The dichroic mirror 49 has a function of transmitting the measurement light L1$a$ and L1$b$ and reflecting the laser light L2$a$ and L2$b$. With this function, the dichroic mirror 49 separates the measurement light L1$a$ and L1$b$ from the laser light L2$a$ and L2$b$. The separated measurement light L1$a$ and L1$b$ transmit through the sample 9 and are incident on the first photodetector 36. The separated laser light L2$a$ and L2$b$ are incident on the second photodetector 45.

Examples of the type of the dichroic mirror 49 include, in addition to a prism element (cube element) illustrated in FIG. 1, a plate element.

The first photodetector 36 receives the interference light of the measurement light L1$a$ and L1$b$, and acquires an intensity of the interference light. Then, a signal corresponding to the intensity is output as a first light reception signal F(t). The first light reception signal F(t) is a signal including a sample-derived signal generated by interaction between the measurement light L1$a$ and L1$b$ and the sample 9 and the first modulation signal described above. The sample-derived signal refers to a waveform change of the first light reception signal F(t) indicating that, for example, light having a specific wavelength is absorbed by reaction with the sample 9. The first modulation signal refers to a waveform change of the first light reception signal F(t) caused accompanying the movement of the movable mirror 33.

Examples of the first photodetector 36 include a photodiode and a phototransistor. Among them, examples of the photodiode include an InGaAs-based photodiode, a Si-based photodiode, and an avalanche photodiode.

The second photodetector 45 receives the laser light L2$a$ and L2$b$ as interference laser light, and acquires an intensity thereof. Then, a signal corresponding to the intensity is output as a second light reception signal S2. The second light reception signal S2 is a signal including the displacement signal of the movable mirror 33 and the above-described second modulation signal. The displacement signal refers to a waveform change added to the second light reception signal S2 according to the position of the movable mirror 33. The second modulation signal refers to a waveform change of the second light reception signal S2 caused by the vibration or the like of the vibrator 30 provided in the optical modulator 43.

Examples of the second photodetector 45 include a photodiode and a phototransistor.

The laser light L2 may be reflected by a diffraction grating, a reflection film, or the like attached to the vibrator 30, and in the present specification, such a case is also included in "reflection by the vibrator 30".

Further, in the optical device 1 described above, the beam splitter 32 is shared by the measurement light L1 and the laser light L2, and the measurement light L1$b$ and the laser light L2$a$ are separated and synthesized by the dichroic mirror 48. That is, the beam splitter 32 has a function of splitting each of the measurement light L1 and the laser light L2. Therefore, it is not necessary to provide a dedicated beam splitter for each of the measurement light L1 and the laser light L2, and the number of components can be reduced in the optical device 1. Further, the dichroic mirror 48 separates the laser light L2$a$ between the beam splitter 32 and the fixed mirror 34, and implements an optical path via the optical modulator 43. Accordingly, since a space between the beam splitter 32 and the fixed mirror 34 can be effectively used, it is possible to add the second modulation signal to the laser light L2$a$ while saving space of the optical device 1. As a result, the size reduction and weight reduction of the optical device 1 can be achieved.

The optical device 1 is described above, and it is preferable that among the optical components provided in the optical device 1, an optical component that needs to be incident with light is subjected to an antireflection treatment. Accordingly, a signal-to-noise ratio (S/N ratio) of the first light reception signal F(t) and the second light reception signal S2 can be increased.

1.2. Signal Generator

The signal generator 8 illustrated in FIG. 1 outputs the drive signal Sd to be input to the optical modulator 43 and the reference signal Ss to be input to the calculation device 7.

Figure 2:
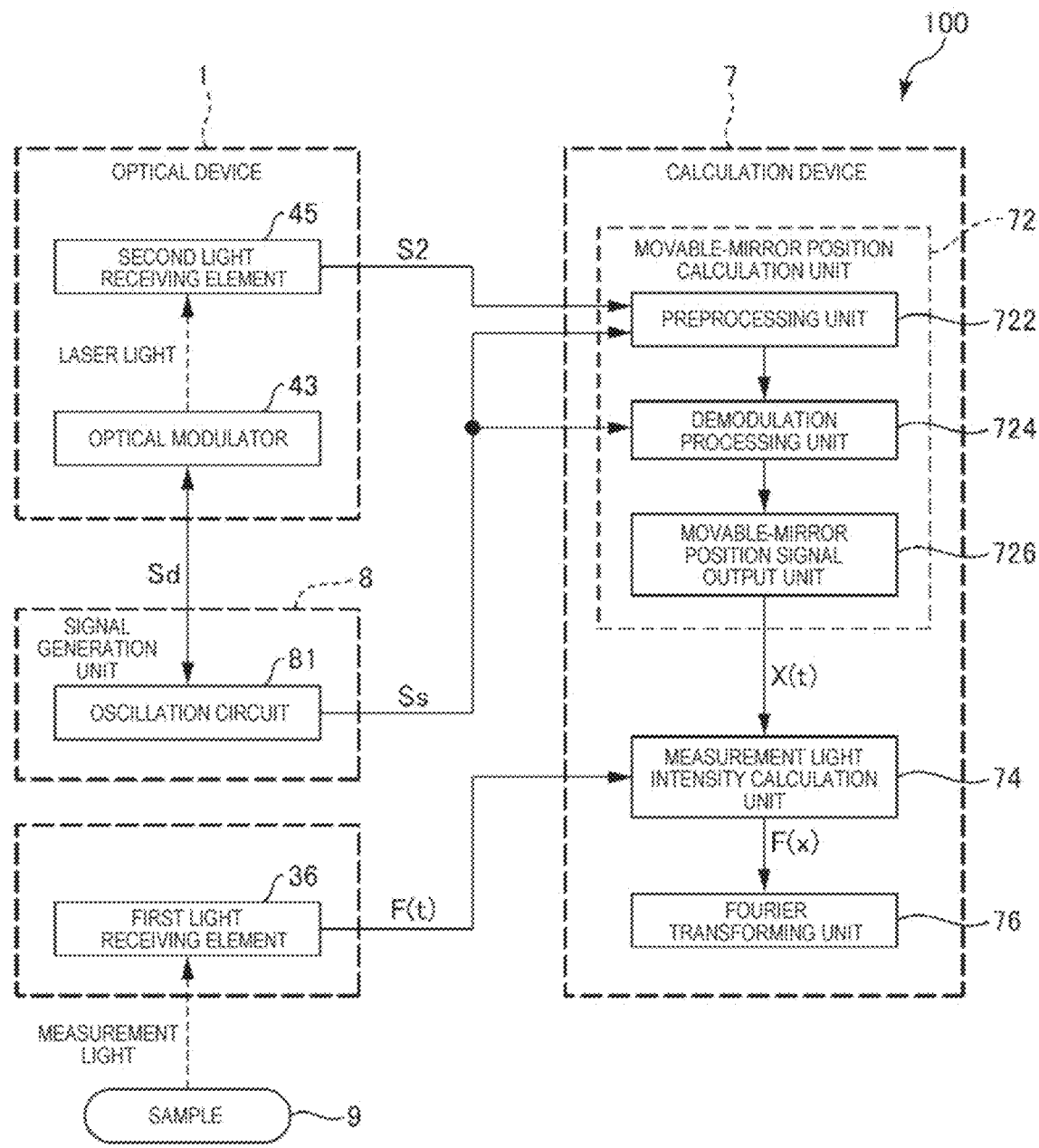
FIG. 2 is a schematic diagram illustrating main parts of an optical device, a signal generator, and a calculation device in FIG. 1.

FIG. 2 is a schematic diagram illustrating main parts of the optical device 1, the signal generator 8, and the calculation device 7 in FIG. 1.

In the embodiment, as illustrated in FIG. 2, the signal generator 8 includes an oscillation circuit 81. The oscillation circuit 81 operates using the vibrator 30 as a signal source to generate a periodic signal having high accuracy. In the spectrometer 100, the periodic signal generated by the oscillation circuit 81 is output as the drive signal Sd and the reference signal Ss. Accordingly, the drive signal Sd and the reference signal Ss are affected in the same way when subjected to disturbance. Then, the second modulation signal added via the optical modulator 43, which is driven based on the drive signal Sd, and the reference signal Ss are also affected in the same way. Therefore, when the displacement signal and the reference signal Ss are subjected to calculation in the calculation device 7, the influence of disturbance included in both can be balanced out or reduced in the process of calculation. As a result, the calculation device 7 can accurately determine the position of the movable mirror 33 even when subjected to disturbance.

Examples of the oscillation circuit 81 include an oscillation circuit disclosed in JP-A-2022-38156.

1.3. Calculation Device

The calculation device 7 illustrated in FIGS. 1 and 2 includes a mirror position calculator 72, a measurement light intensity calculator 74, and a Fourier transformer 76. Functions of these functional units are implemented by, for example, hardware including a processor, a memory, an external interface, an input unit, a display unit, and the like. Specifically, the processor reads and executes a program stored in the memory, thereby implementing the functions. These components can communicate with one another via an internal bus.

Examples of the processor include a central processing unit (CPU) and a digital signal processor (DSP). Instead of a method in which these processors execute software, a method in which a field-programmable gate array (FPGA), an application specific integrated circuit (ASIC), or the like implements the above-described functions may be adopted.

Examples of the memory include a hard disk drive (HDD), a solid state drive (SSD), an electrically erasable programmable read-only memory (EEPROM), a read-only memory (ROM), and a random access memory (RAM).

Examples of the external interface include a digital input/output port such as a universal serial bus (USB), and an Ethernet (registered trademark) port.

Examples of the input unit include various input devices such as a keyboard, a mouse, a touch panel, and a touch pad. Examples of the display unit include a liquid crystal display panel and an organic electro luminescence (EL) display panel.

The external interface, the input unit, and the display unit may be provided as necessary, and may be omitted.

1.3.1. Mirror Position Calculator

The mirror position calculator 72 performs calculation on the second light reception signal S2 based on the reference signal Ss output from the signal generator 8. Accordingly, the mirror position signal X(t) indicating the position of the movable mirror 33 is generated. That is, the mirror position calculator 72 specifies the position of the movable mirror 33 by the laser interferometer technique, and generates the mirror position signal X(t) based on a result of the specification.

The mirror position calculator 72 illustrated in FIG. 2 includes a preprocessing unit 722, a demodulation processing unit 724, and a mirror position signal output unit 726. As the preprocessing unit 722 and the demodulation processing unit 724, for example, a preprocessing unit and a demodulation unit disclosed in JP-A-2022-38156 can be applied.

The preprocessing unit 722 performs preprocessing on the second light reception signal S2 based on the reference signal Ss. The demodulation processing unit 724 demodulates a displacement signal reflecting the movement of the movable mirror 33 based on the reference signal Ss, from a preprocessed signal output from the preprocessing unit 722.

The mirror position signal output unit 726 generates the mirror position signal X(t) based on the displacement signal of the movable mirror 33 demodulated by the demodulation processing unit 724, and outputs the mirror position signal X(t). Since the movable mirror 33 reciprocates, for example, along the incident direction of the measurement light L1a, the mirror position signal X(t) is a signal indicating the position of the movable mirror 33 that changes each time point. The displacement signal of the movable mirror 33 included in the second light reception signal S2 captures the displacement of the movable mirror 33 at an interval sufficiently narrower than a wavelength of the laser light L2. Specifically, even if the wavelength of the laser light L2 is, for example, several hundreds of nm, position resolution of the movable mirror 33 indicated by the displacement signal can be less than 10 nm. Therefore, the measurement light intensity calculator 74, which will be described later, can generate a waveform at a finer interval than in the related art.

1.3.2. Measurement Light Intensity Calculator

The measurement light intensity calculator 74 generates a waveform (interferogram F(x)) representing the intensity of the interference light with respect to the position of the movable mirror 33 based on the first light reception signal F(t) and the mirror position signal X(t).

The first light reception signal F(t) is a signal indicating the intensity of the interference light incident on the first photodetector 36 at each time point. As described above, the first light reception signal F(t) includes the sample-derived signal and the first modulation signal. As described above, since the first modulation signal is a waveform change reflecting the movement of the movable mirror 33, the measurement light intensity calculator 74 associates the first modulation signal with the mirror position signal X(t) to extract a waveform reflecting the sample-derived signal. Specifically, the measurement light intensity calculator 74 aligns a time point of the first light reception signal F(t) and a time point of the mirror position signal X(t). Then, the measurement light intensity calculator 74 generates the interferogram F(x) based on the position of the movable mirror 33 and the intensity indicated by the first light reception signal F(t) at the same time point.

Figure 3:
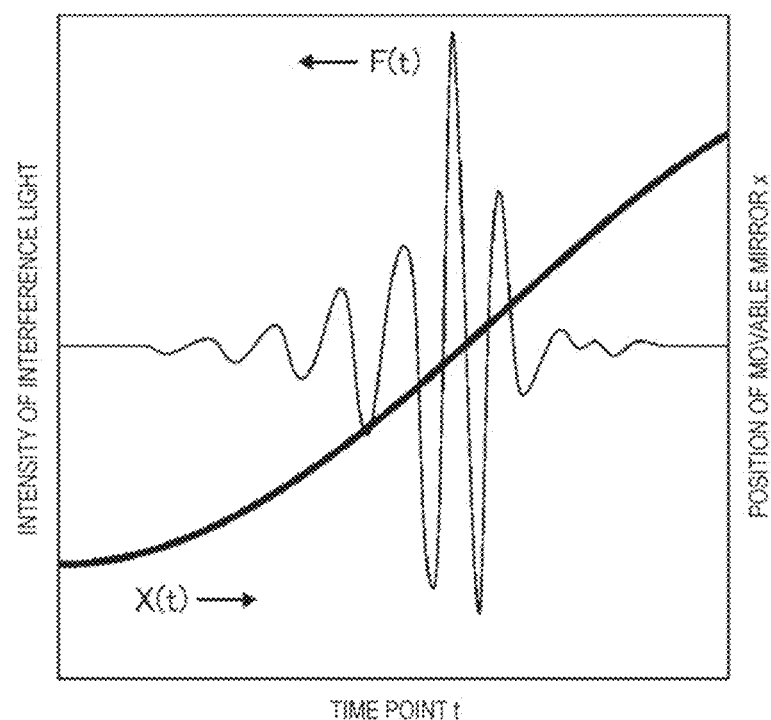
FIG. 3 is a graph illustrating an example of a first light reception signal and a mirror position signal.

FIG. 3 is a graph illustrating an example of the first light reception signal F(t) and the mirror position signal X(t). In FIG. 3, a horizontal axis represents the time point, and a vertical axis represents the intensity of the interference light incident on the first photodetector 36 or the position of the movable mirror 33.

Figure 4:
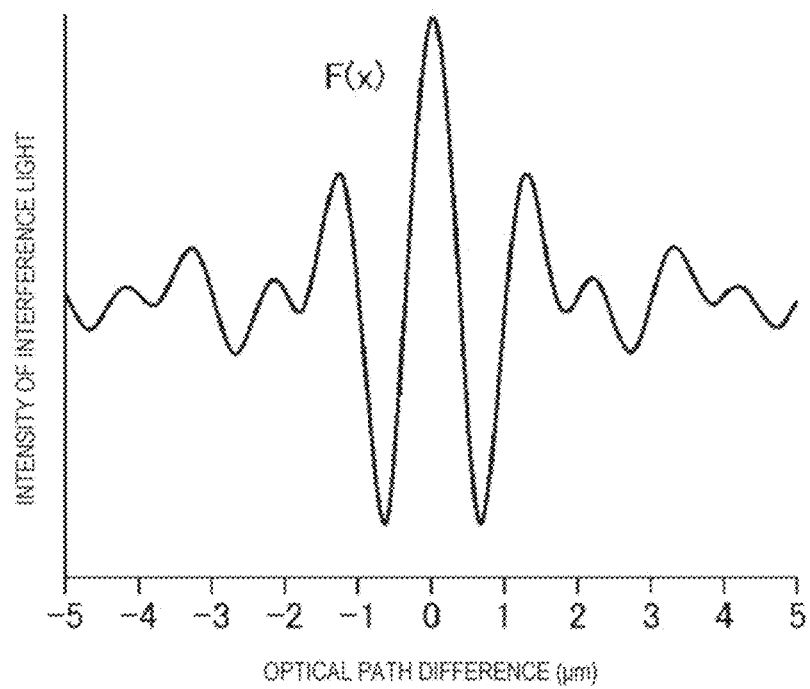
FIG. 4 is a graph illustrating an example of an interferogram.

FIG. 4 is a graph illustrating an example of the interferogram F(x). In FIG. 4, a horizontal axis represents an optical path difference in the optical device 1 obtained based on the position of the movable mirror 33, and a vertical axis represents the intensity of the interference light of the measurement light L1a and L1b. The optical path difference in the optical device 1 is a difference between an optical path length from the beam splitter 32 to the movable mirror 33 and an optical path length from the beam splitter 32 to the fixed mirror 34, and in FIG. 4, the optical path difference of zero is set as an origin of the horizontal axis.

As described above, in the embodiment, the mirror position signal X(t) indicating the position of the movable mirror 33 can be acquired with high accuracy (high position resolution). Therefore, by generating the interferogram F(x) based thereon, an interferogram F(x) having a large number of data points can be obtained. The large number of data points means that the interferogram F(x) has a short sampling interval and high accuracy. Therefore, by using the interferogram F(x) obtained in this manner, spectral information having high resolution can be finally acquired.

Since the sampling interval can be reduced, an interferogram F(x) having a sufficient number of data points can be obtained even when the measurement light L1 having a shorter wavelength (a larger wavenumber) is used. Accordingly, spectral information for a wider wavelength range (a wider wavenumber range), that is, spectral information for a wider band can be obtained.

1.3.3. Fourier Transformer

The Fourier transformer 76 performs Fourier transform on the interferogram F(x). Accordingly, the spectral information is acquired.

As described above, in the embodiment, digital data of the interferogram F(x) can be acquired at a sufficiently short optical path difference interval. Accordingly, the number of data points of the interferogram F(x) can be sufficiently increased. By performing Fourier transform on the interferogram F(x), spectral information with sufficiently high wavenumber resolution or sufficiently high wavelength resolution can be acquired even when the measurement light L1 having a shorter wavelength (a larger wavenumber) is used.

The obtained spectral information reflects the highly accurate sample-derived signal generated by the measurement light L1a and L1b acting on the sample 9. Therefore, characteristics of the sample 9 can be accurately analyzed based on the spectral information. That is, the spectrometer 100 that enables highly accurate spectroscopic analysis can be implemented.

1.3.4. Relationship Between Measurement Accuracy of Movable Mirror Position, Spectral Wavenumber Accuracy, and Spectral Wavelength Accuracy As described above, in the embodiment, since the mirror position signal X(t) can be obtained with high accuracy, spectral information having sufficiently high wavenumber resolution or sufficiently high wavelength resolution can be obtained.

In particular, in the optical device 1, by bringing a difference between a physical distance from the beam splitter 32 to the optical modulator 43 and a physical distance from the beam splitter 32 to the movable mirror 33 close to zero, the accuracy of the mirror position signal X(t) can be further improved.

When the position of the movable mirror 33 is measured in the optical device 1, a measurement error Δd is expressed by the following formula (I), $$\Delta d = \frac{\lambda \Delta \phi}{4\pi n} + WD\left(\frac{\Delta \lambda}{\lambda} + \frac{\Delta n}{n}\right) \quad (I)$$

the parameters being
λ: wavelength of laser light L2;
φ: phase of displacement signal reflecting movement of movable mirror 33;
n: refractive index of air;
WD: difference between physical distance from beam splitter 32 to optical modulator 43 and physical distance from beam splitter 32 to movable mirror 33;
Δφ: measurement error in phase of displacement signal;
Δλ: fluctuation in wavelength of laser light L2; and
Δn: fluctuation in refractive index of air.

In the above formula (I), a second term and a third term on a right side, which may be noise components in the measurement error Δd, can be reduced by bringing a difference WD between the physical distances close to zero. Accordingly, the measurement error Δd is reduced, and thus the accuracy of the mirror position signal X(t) can be further improved.

Specifically, in the optical device 1, |Ls−Lref|≤100 mm is preferable, where Lref is the optical path length from the beam splitter 32 to the optical modulator 43 and Ls is the optical path length from the beam splitter 32 to the movable mirror 33. Accordingly, the difference WD between the physical distances in the above formula (I) can be sufficiently reduced, and the measurement error Δd on order of 1 nm or less can be achieved.

On the other hand, assuming that Lm is a moving distance (an amplitude) of the movable mirror 33 when the movable mirror 33 reciprocates, it is preferred that |Ls−Lref|≤Lm/2 in consideration of the moving distance Lm. Accordingly, the measurement error Δd can be particularly reduced in consideration of the moving distance Lm of the movable mirror 33.

In consideration of |Ls−Lref|≤100 mm described above, the maximum value of the moving distance Lm of the movable mirror 33 can be considered to be 200 mm. Accordingly, the moving distance Lm of the movable mirror 33 is preferably 200 mm or less. Accordingly, the measurement error Δd of the movable mirror 33 can be particularly reduced.

Figure 5:
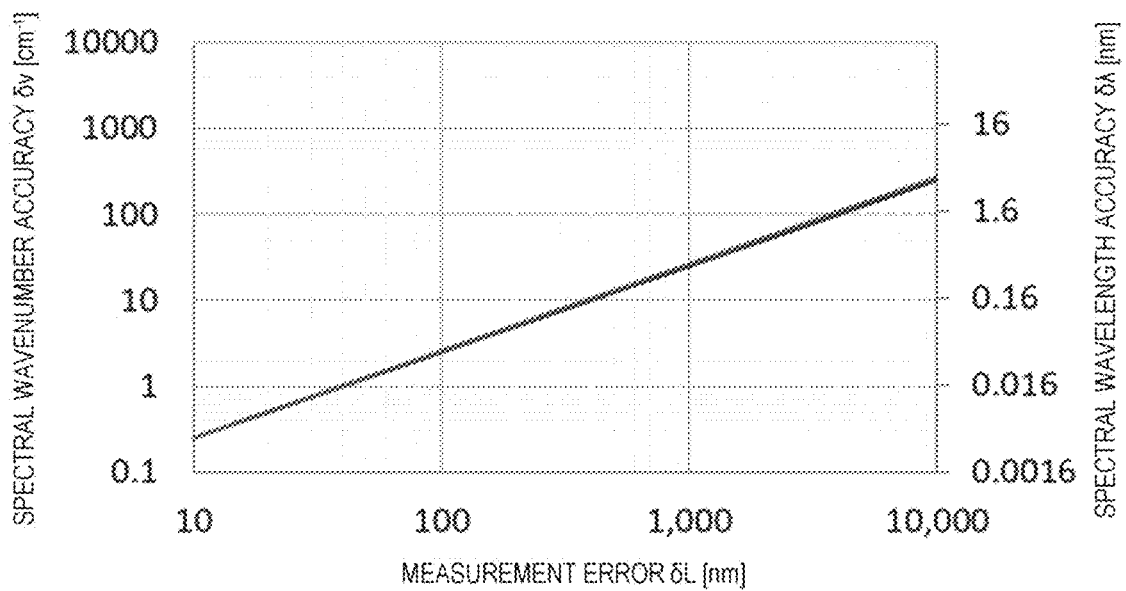
FIG. 5 is a graph illustrating a relationship between a measurement error in a position of a movable mirror and an error in a spectral wavenumber (spectral wavenumber accuracy) in spectral information or an error in a spectral wavelength (spectral wavelength accuracy) when light (visible light) having a wavelength of 400 nm is used as measurement light.
Figure 6:
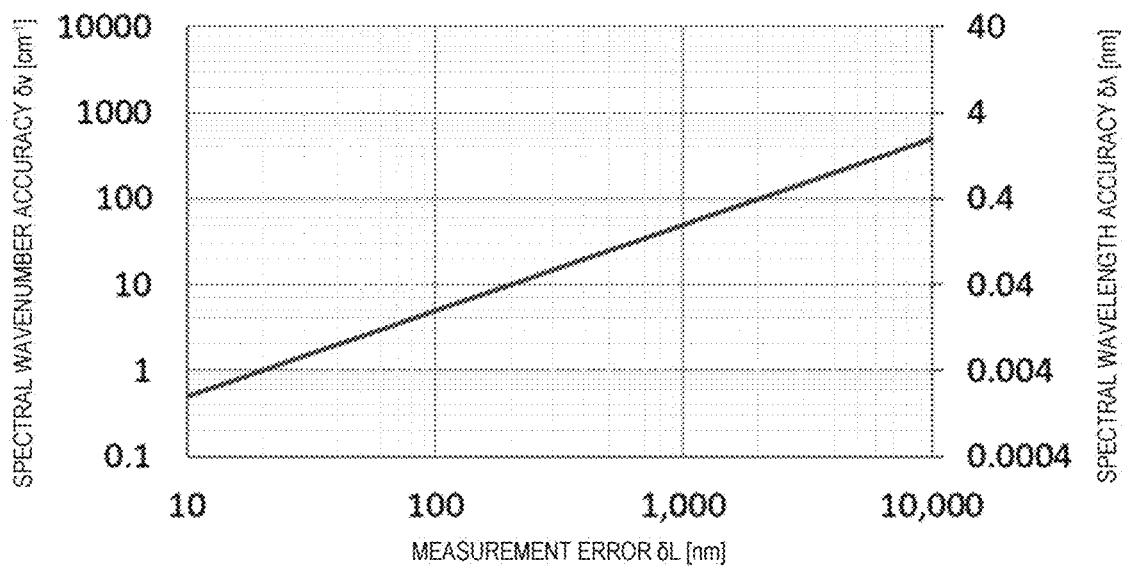
FIG. 6 is a graph illustrating a relationship between the measurement error in the position of the movable mirror and the error in the spectral wavenumber (spectral wavenumber accuracy) in the spectral information or the error in the spectral wavelength (spectral wavelength accuracy) when light (visible light) having a wavelength of 200 nm is used as the measurement light.

FIG. 5 is a graph illustrating a relationship between a measurement error δL in the position of the movable mirror 33 and an error in the spectral wavenumber (spectral wavenumber accuracy δv) in the spectral information or an error in the spectral wavelength (spectral wavelength accuracy δλ) when light having a wavelength of 400 nm (visible light) is used as the measurement light L1. FIG. 6 is a graph illustrating a relationship between the measurement error δL in the position of the movable mirror 33 and the error in the spectral wavenumber (spectral wavenumber accuracy δv) in the spectral information or the error in the spectral wavelength (spectral wavelength accuracy δλ) when light having a wavelength of 200 nm (ultraviolet light) is used as the measurement light L1. In the examples illustrated in FIGS. 5 and 6, a moving distance L of the movable mirror 33 is 1 mm, and the measurement error is δL.

In general, wavenumber resolution Δv can be increased by increasing the moving distance L of the movable mirror 33. For example, when the moving distance L is 1 mm, the wavenumber resolution Δv calculated from the spectral information obtained by sampling the interferogram by a method in the related art is 5 $cm^{-1}$.

In the examples illustrated in FIGS. 5 and 6, the relationship between the measurement error δL and the spectral wavenumber accuracy δv or the spectral wavelength accuracy δλ when the moving distance L of the movable mirror 33 is 1 mm is illustrated. In FIG. 5, for example, when the measurement error δL is 100 nm, the spectral wavenumber accuracy δv is about 2.5 $cm^{-1}$, and the spectral wavelength accuracy δλ is about 0.04 nm. In FIG. 6, for example, when the measurement error δL is 100 nm, the spectral wavenumber accuracy δv is about 5.0 $cm^{-1}$, and the spectral wavelength accuracy δλ is about 0.02 nm. The measurement error δL of 100 nm can be easily achieved by using the optical device 1 according to the embodiment. Accordingly, it is understood from the results of FIGS. 5 and 6 that even when light having a shorter wavelength is used as the measurement light L1, spectral wavenumber accuracy δv and spectral wavelength accuracy δλ that are at least of the same level as that of the above-described wavenumber resolution δv or the wavelength resolution calculated therefrom can be obtained. Therefore, by reducing the measurement error δL using the optical device 1 according to the embodiment, the spectral wavenumber accuracy δv and the spectral wavelength accuracy δλ can be maintained or improved regardless of the wavelength of the measurement light L1, in other words, even when the measurement light L1 having a wide wavelength range is used.

Figure 7:
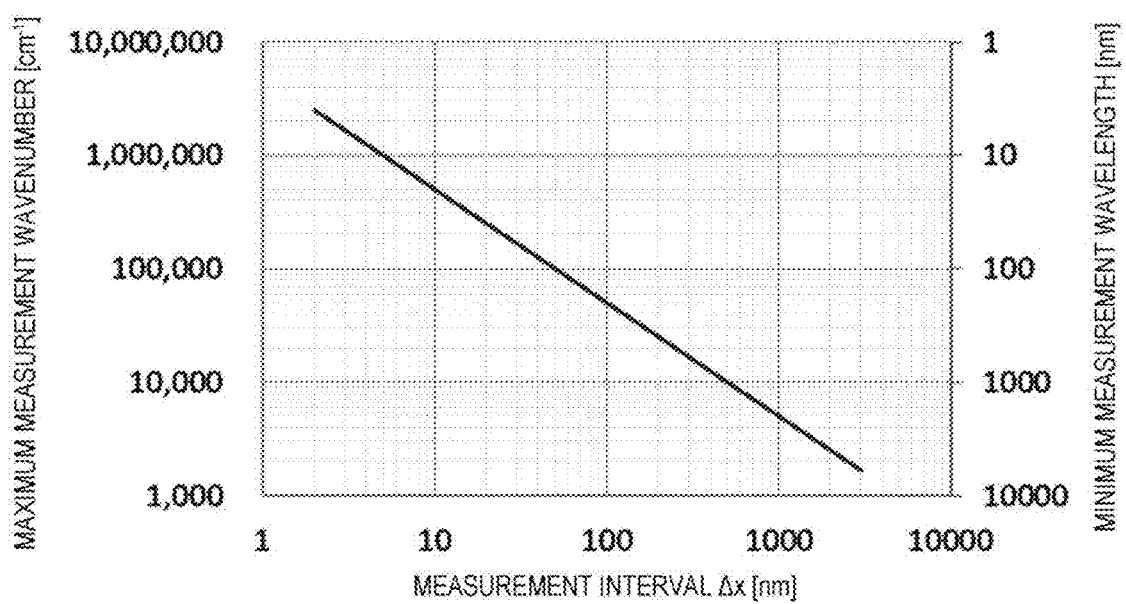
FIG. 7 is a graph illustrating a relationship between a measurement interval of the movable mirror and a maximum measurement wavenumber or a minimum measurement wavelength in spectral information.

1.3.5. Relationship Between Measurement Interval of Movable Mirror Position, Maximum Measurement Wavenumber, and Minimum Measurement Wavelength FIG. 7 is a graph illustrating a relationship between a measurement interval Δx of the movable mirror 33 and a maximum measurement wavenumber or a minimum measurement wavelength in the spectral information. As illustrated in FIG. 7, as the measurement interval Δx decreases, the maximum measurement wavenumber increases and the minimum measurement wavelength decreases. Therefore, by reducing the measurement interval Δx, spectral information for a wider wavenumber range (wavelength range) (spectral information for a wider band) can be acquired. In order to achieve the stable measurement interval Δx, it is preferable to achieve that the measurement error Δd is equal to or less than ¹⁄₁₀ of the measurement interval Δx. Accordingly, it can be said that the measurement error Δd on order of 1 nm described above is the measurement accuracy at which the measurement interval Δx=10 nm in FIG. 7 can be achieved.

2. First Modification of First Embodiment

Next, an optical device and a spectrometer according to a first modification of the first embodiment will be described.

Figure 8:
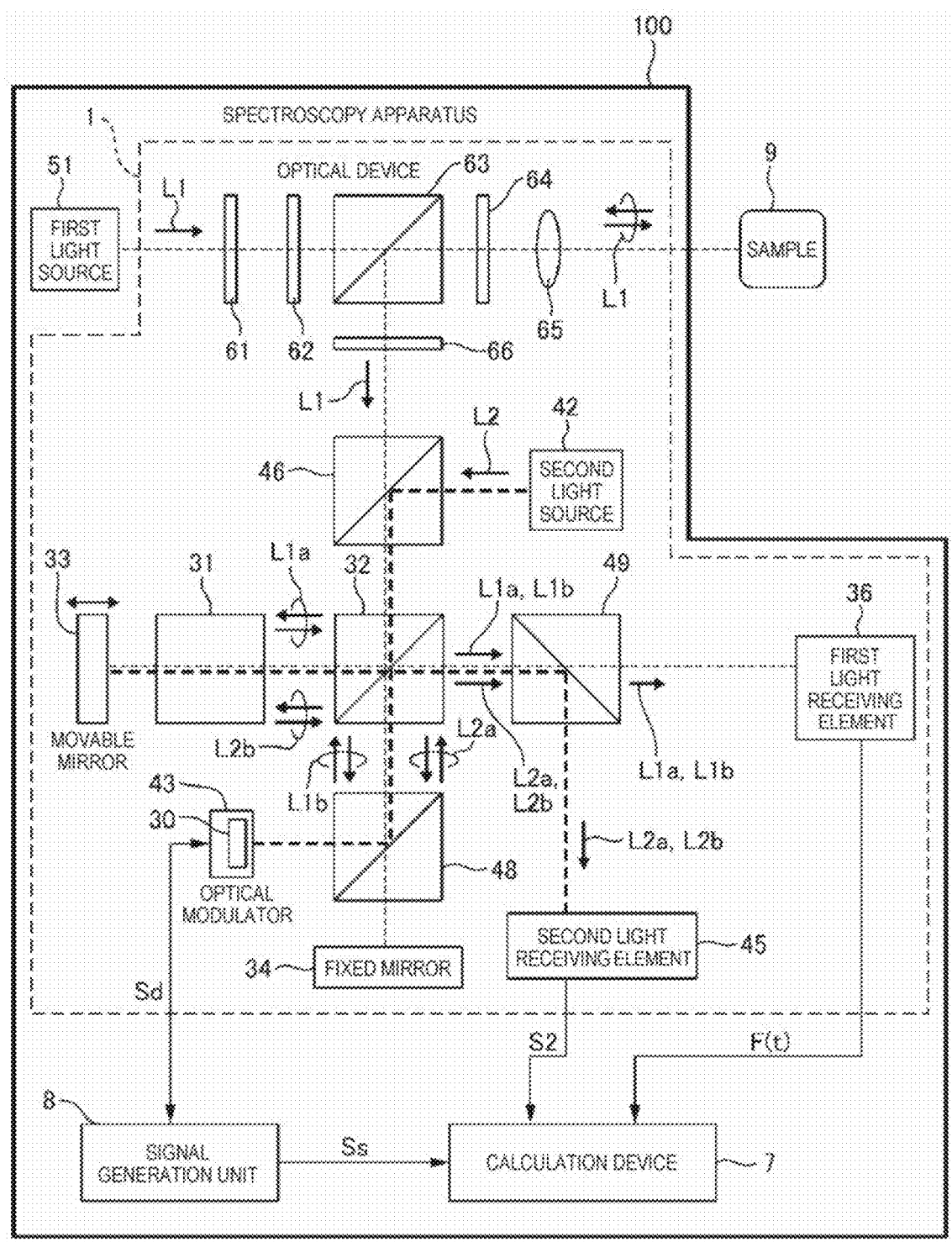
FIG. 8 is a schematic configuration diagram illustrating a schematic configuration of a spectrometer according to a first modification of the first embodiment.

FIG. 8 is a schematic configuration diagram illustrating a schematic configuration of a spectrometer according to the first modification of the first embodiment.

The spectrometer 100 illustrated in FIG. 8 is the same as the spectrometer 100 illustrated in FIG. 1 except that configurations of the optical device 1 are different, and that the spectrometer 100 is applicable to Raman spectroscopic analysis, fluorescence spectroscopic analysis, or the like for the sample 9.

The optical device 1 illustrated in FIG. 8 includes, in addition to the configuration of the first embodiment, a bandpass filter 61, a half-wavelength plate 62, a beam splitter 63, a quarter-wavelength plate 64, a condensing lens 65, and a light-attenuating filter 66. The optical device 1 illustrated in FIG. 8 is configured to irradiate the sample 9 with the measurement light L1 before the measurement light L1 is incident on the beam splitter 32.

The first light source 51 illustrated in FIG. 8 is appropriately selected according to a purpose such as Raman spectroscopy, fluorescence spectroscopy, or the like. For example, in the case of Raman spectroscopy, a light source that emits light having a narrow spectral line width as the measurement light L1 is used. In the case of fluorescence spectroscopy, an optimal light source is used according to the type of the sample 9. In the case of Raman spectroscopy, for example, a gas laser such as a He—Ne laser or an Ar laser, a semiconductor laser element such as a DFB-LD, an FBG-LD, a VCSEL, or an FP-LD, or a solid-state laser is used as the first light source 51. In the case of the fluorescence spectroscopy, for example, a xenon lamp or a mercury lamp is used as the first light source 51. FIG. 8 illustrates the optical device 1 in which the first light source 51 is a laser light source.

The bandpass filter 61 transmits the light emitted from the first light source 51 as the measurement light L1 after cutting off light in unnecessary wavelengths. The measurement light L1 transmitted through the half-wavelength plate 62 is linearly polarized light including P-polarized light and S-polarized light, and is split into two, that is, the P-polarized light and the S-polarized light by the beam splitter 63 that is a polarization beam splitter. The measurement light L1, which is P-polarized light, is converted into circularly polarized light by the quarter-wavelength plate 64, passes through the condensing lens 65, and is incident on the sample 9. The measurement light L1 emitted from the sample 9, together with Raman scattered light, fluorescence, and the like, passes through the condensing lens 65, is converted into S-polarized light by the quarter-wavelength plate 64, and is reflected by the beam splitter 63. When the measurement light L1 passes through the light-attenuating filter 66, most of the measurement light L1 is selectively attenuated, and the Raman scattered light, the fluorescence, and the like propagating together with the measurement light L1 are selectively transmitted. That is, when a wavelength of the measurement light L1 is set as a "first wavelength", the light-attenuating filter 66 attenuates light having the first wavelength and passes light including a sample-derived signal. Accordingly, even when an intensity of the light including the sample-derived signal is weak, the second photodetector 45 can output the second light reception signal S2 having a high S/N ratio. Examples of the light-attenuating filter 66 include a notch filter and a Raman long-pass filter having an optical density (OD value) of 6.0 or more.

An avalanche photodiode is particularly preferably used as the first photodetector 36 provided in the optical device 1 illustrated in FIG. 8. Accordingly, the Raman scattered light, the fluorescence, and the like can be more appropriately received.

In the first modification as described above, the same effects as those of the first embodiment can also be obtained.

3. Second Modification of First Embodiment

Next, an optical device and a spectrometer according to a second modification of the first embodiment will be described.

Figure 9:
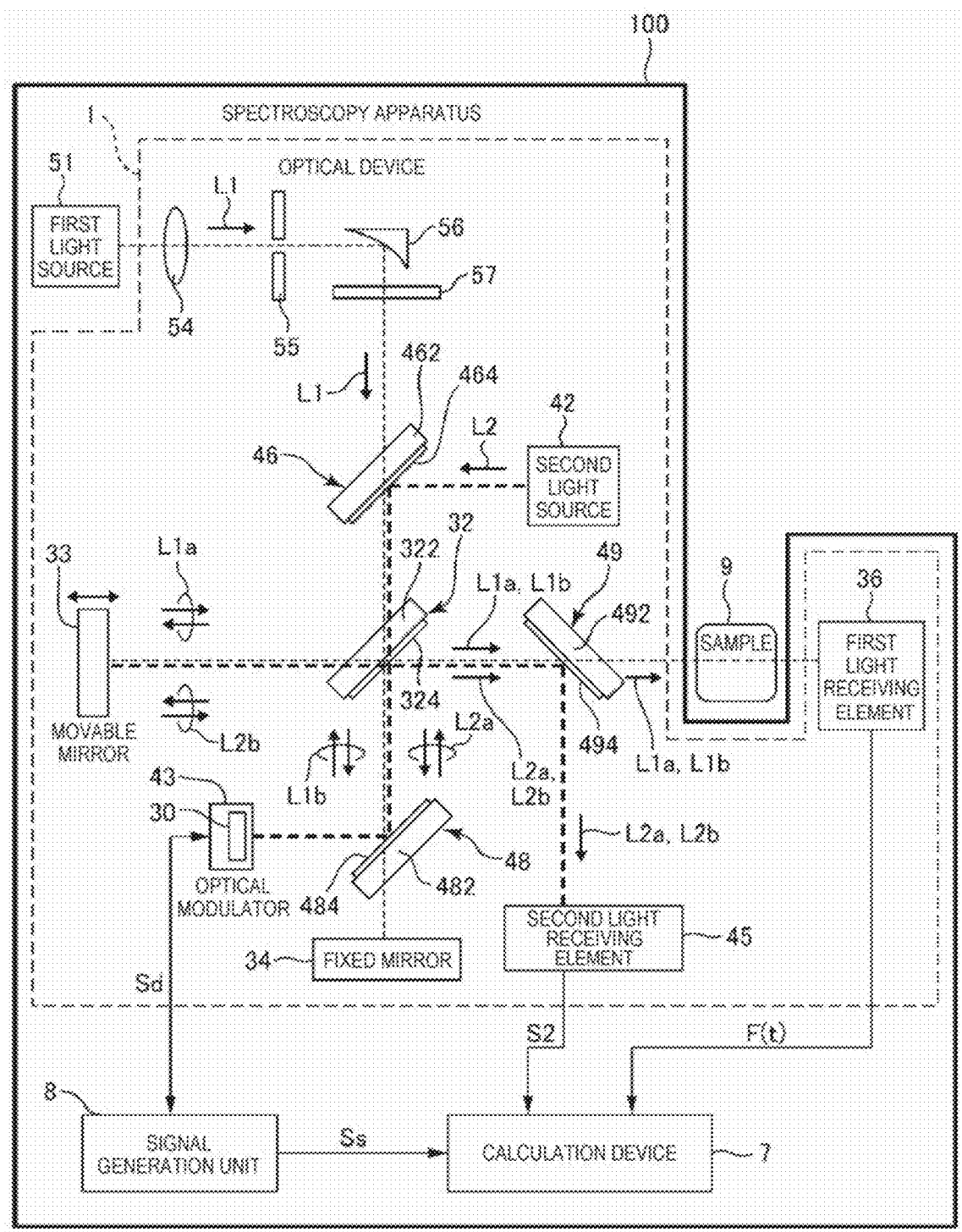
FIG. 9 is a schematic configuration diagram illustrating a schematic configuration of a spectrometer according to a second modification of the first embodiment.

FIG. 9 is a schematic configuration diagram illustrating a schematic configuration of the spectrometer according to the second modification of the first embodiment.

The spectrometer 100 illustrated in FIG. 9 is the same as the spectrometer 100 illustrated in FIG. 1 except that configurations of the optical device 1 are different.

Similarly to the optical device 1 illustrated in FIG. 1, the optical device 1 illustrated in FIG. 9 includes the beam splitter 32 and the dichroic mirrors 46, 48, and 49. However, the optical components shown in FIG. 9 are different from those shown in FIG. 1 in type. Specifically, while the beam splitter 32 shown in FIG. 1 is a prism element, the beam splitter 32 shown in FIG. 9 is a plate element.

As illustrated in FIG. 9, a beam splitter 32 (light splitter) of a plate type includes a transparent flat plate 322 having a front surface and a back surface in a front and back relationship, and an optical thin film 324 formed at the back surface of the transparent flat plate 322. The beam splitter 32 of the plate type is more lightweight or larger in diameter and costs less than a prism element.

On the other hand, the beam splitter 32 of the plate type has a different optical path length along which transmitted light and reflected light pass through a glass material. Therefore, in FIG. 9, the beam splitter 32 of the plate type is disposed in such a posture that the optical thin film 324 faces the fixed mirror 34. With such a posture, the measurement light L1a reflected by the beam splitter 32 illustrated in FIG. 9 passes through the transparent flat plate 322 twice. On the other hand, the measurement light L1b transmitted through the beam splitter 32 illustrated in FIG. 9 passes through the transparent flat plate 322 once. Accordingly, in the optical device 1 illustrated in FIG. 9, since the number of times the measurement light L1a reflected by the beam splitter 32 passes through the glass material is large, the wavelength dispersion compensation plate 31 illustrated in FIG. 1 is unnecessary. Accordingly, the number of components of the optical device 1 can be reduced.

The dichroic mirrors 46, 48 and 49 illustrated in FIG. 1 are all prism elements, whereas the dichroic mirrors 46, 48 and 49 illustrated in FIG. 9 are all plate elements.

As illustrated in FIG. 9, the dichroic mirror 48 (first color separator) of the plate type includes a transparent flat plate 482 having a front surface and a back surface in a front and back relationship, and an optical thin film 484 formed at the front surface of the transparent flat plate 482. The dichroic mirror 48 of the plate type has the same function as the dichroic mirror 48 of the prism type. A path length (physical distance) of the measurement light L1b in the transparent flat plate 482 is preferably equal to a path length (physical distance) of the measurement light L1b in the transparent flat plate 322. Further, a constituent material (glass material) of the transparent flat plate 482 is preferably the same as a constituent material of the transparent flat plate 322. Accordingly, the transparent flat plate 482 has not only a function for serving as a part of the dichroic mirror 48 but also a function for serving as a wavelength dispersion compensation plate. Therefore, by configuring the transparent flat plate 482 as described above, wavelength dispersion can be compensated without increasing the number of components, and it is possible to prevent the wavelength dispersion from eventually affecting an interferogram and spectral information.

As illustrated in FIG. 9, the dichroic mirror 49 (second color separator) of the plate type includes a transparent flat plate 492 having a front surface and a back surface in a front and back relationship, and an optical thin film 494 formed at the back surface of the transparent flat plate 492. The dichroic mirror 49 of the plate type has the same function as the dichroic mirror 49 of the prism type.

As illustrated in FIG. 9, the dichroic mirror 46 (third color separator) of the plate type includes a transparent flat plate 462 having a front surface and a back surface in a front and back relationship, and an optical thin film 464 formed at the back surface of the transparent flat plate 462. The dichroic mirror 46 of the plate type has the same function as the dichroic mirror 46 of the prism type.

In the optical device 1 illustrated in FIG. 9, at least one of the dichroic mirrors 46 and 49 of the plate type may be replaced with a prism element.

In the second modification as described above, the same effects as those of the first embodiment can also be obtained.

4. Third Modification of First Embodiment

Next, an optical device and a spectrometer according to a third modification of the first embodiment will be described.

Figure 10:
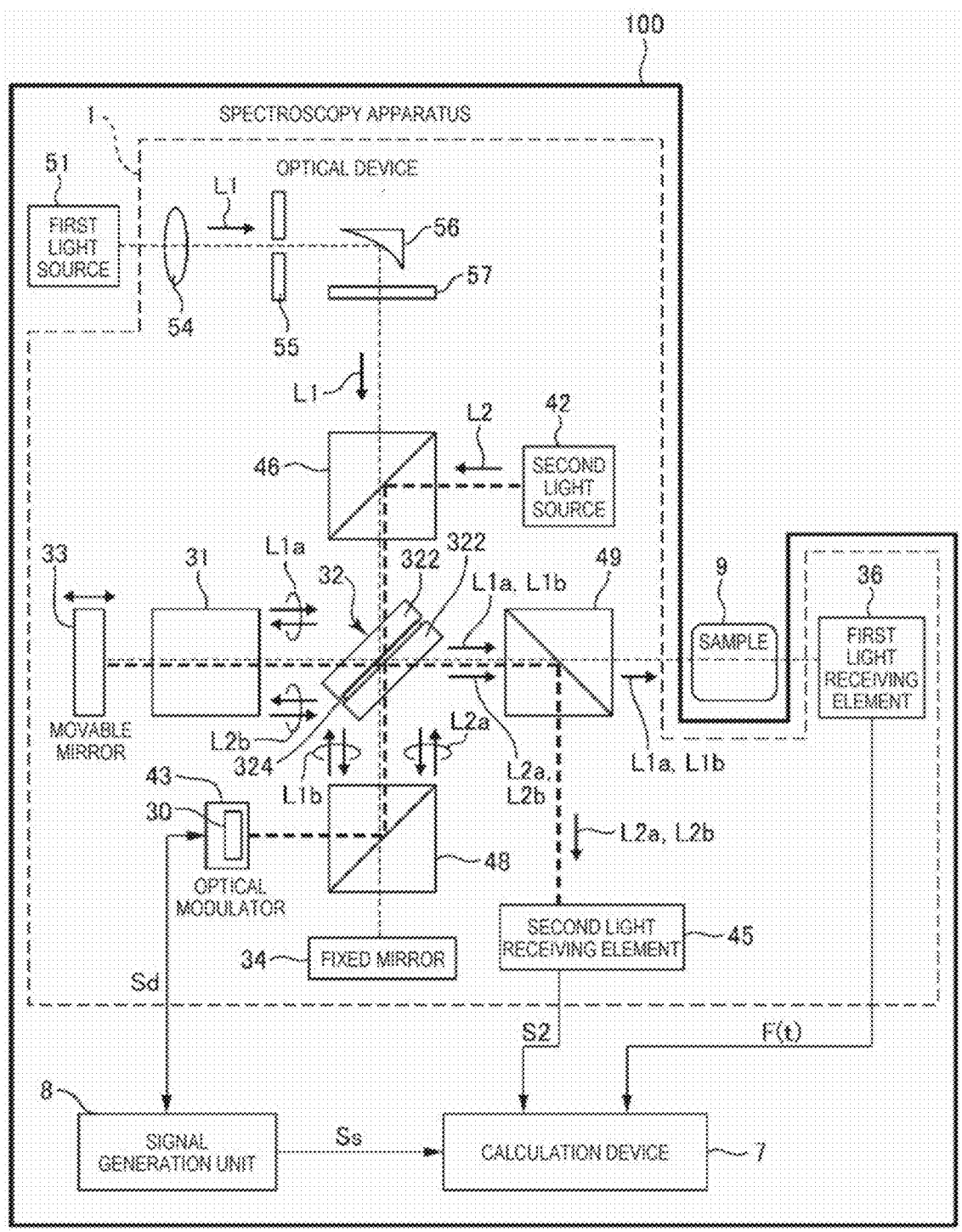
FIG. 10 is a schematic configuration diagram illustrating a schematic configuration of a spectrometer according to a third modification of the first embodiment.

FIG. 10 is a schematic configuration diagram illustrating a schematic configuration of the spectrometer according to the third modification of the first embodiment.

The spectrometer 100 illustrated in FIG. 10 is the same as the spectrometer 100 illustrated in FIG. 1 except that configurations of the optical device 1 are different.

The optical device 1 illustrated in FIG. 10 includes the beam splitter 32 similarly to the optical device 1 illustrated in FIG. 1. However, the beam splitter 32 shown in FIG. 10 is different in type from that shown in FIG. 1. Specifically, the beam splitter 32 shown in FIG. 1 is a prism element, whereas the beam splitter 32 shown in FIG. 10 is a stacked element.

As illustrated in FIG. 10, the beam splitter 32 (light splitter) of the stacked type includes the transparent flat plates 322 and 322, and the optical thin film 324 formed between the transparent flat plates 322 and 322. Similar to the prism element, the beam splitter 32 of the stacked type has the same optical path length along which transmitted light and reflected light pass through a glass material. Therefore, the beam splitter 32 of the stacked type can replace the beam splitter 32 of the prism type. Therefore, also in the modification, there is an advantage that it is not necessary to dispose a wavelength dispersion compensation plate between the beam splitter 32 and the fixed mirror 34.

The beam splitter 32 of the stacked type is more lightweight or larger in diameter and costs less than a prism element. Further, in the beam splitter 32 of the stacked type, unintended reflection at a surface is reduced as compared with that in the case of the plate element. Accordingly, it is possible to prevent noise light from being incident on the first photodetector 36. The unintended reflection at a surface is, for example, reflection of the measurement light L1b at an interface between the transparent flat plate 322 and the air, which is transmitted without being reflected by the optical thin film 324 illustrated in FIG. 9, when the measurement light L1b reflected by the fixed mirror 34 is reflected by the beam splitter 32. In the stacked element, such unintended reflection at a surface is reduced. In addition, since the optical thin film 324 is not exposed in the stacked element, the optical thin film 324 is excellent in weather resistance. Therefore, by using the stacked element, it is possible to enhance long-term reliability of the beam splitter 32 as compared with a case where the plate element is used.

In the third modification described above, the same effects as those of the first embodiment can also be obtained.

5. Fourth Modification of First Embodiment

Next, a spectrometer according to a fourth modification of the first embodiment will be described.

Figure 11:
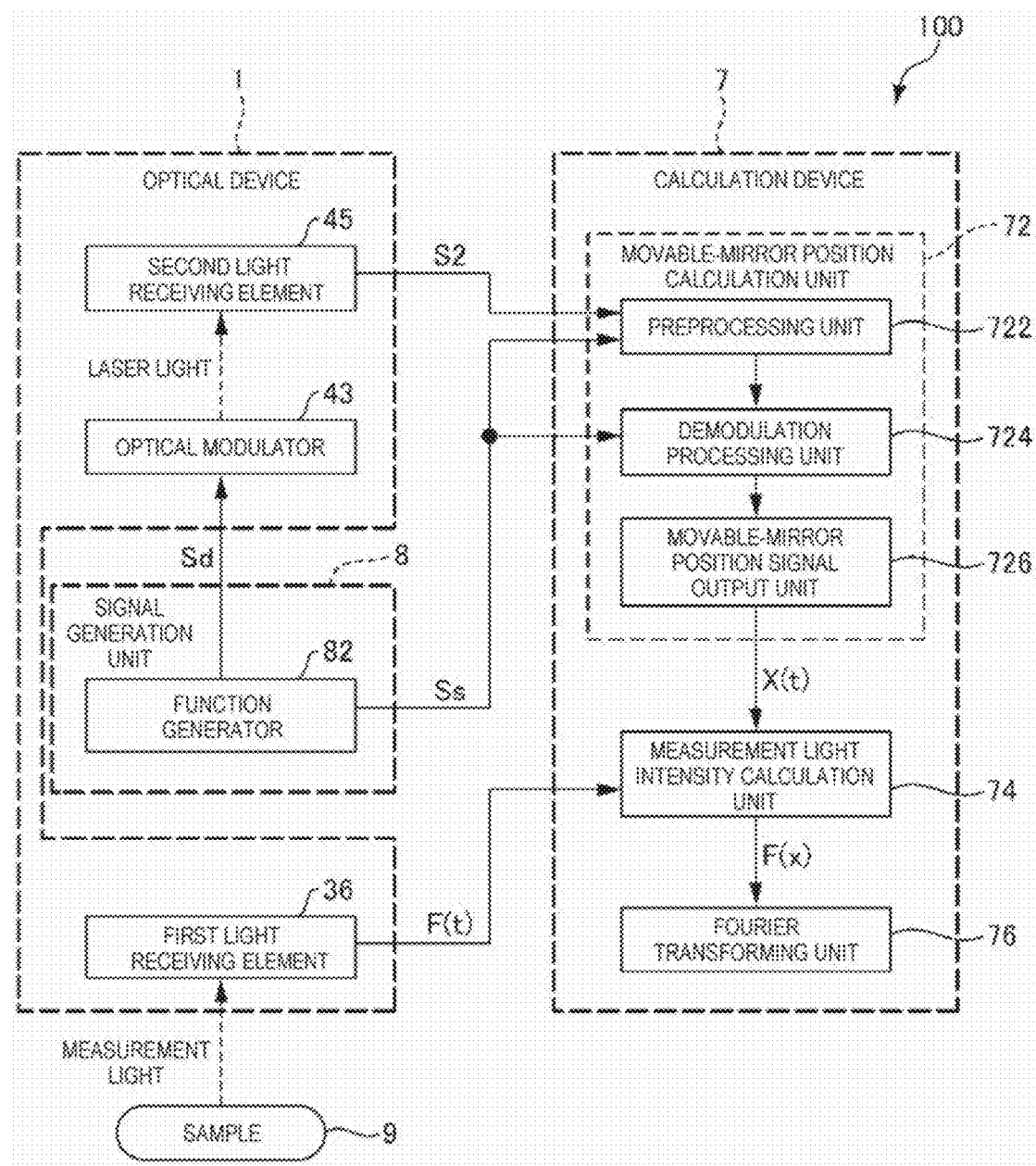
FIG. 11 is a schematic diagram illustrating main parts of an optical device, a signal generator, and a calculation device that are provided in a spectrometer according to a fourth modification of the first embodiment.

FIG. 11 is a schematic diagram illustrating main parts of the optical device 1, the signal generator 8, and the calculation device 7 provided in the spectrometer according to the fourth modification of the first embodiment.

The spectrometer 100 illustrated in FIG. 11 is the same as the spectrometer 100 illustrated in FIG. 2 except that configurations of the signal generator 8 are different.

The signal generator 8 shown in FIG. 11 includes a function generator 82. The function generator 82 is a generator that outputs a highly accurate waveform, that is, a highly stable and low-jitter signal. Therefore, the signal generator 8 shown in FIG. 11 can output the drive signal Sd and the reference signal Ss with higher accuracy, and a position of the movable mirror 33 can eventually be obtained with higher accuracy in the calculation device 7. The function generator 82 may be a generator called a signal generator.

In the fourth modification described above, the same effects as those of the first embodiment can also be obtained.

6. Fifth Modification of First Embodiment

Next, a spectrometer according to a fifth modification of the first embodiment will be described.

Figure 12:
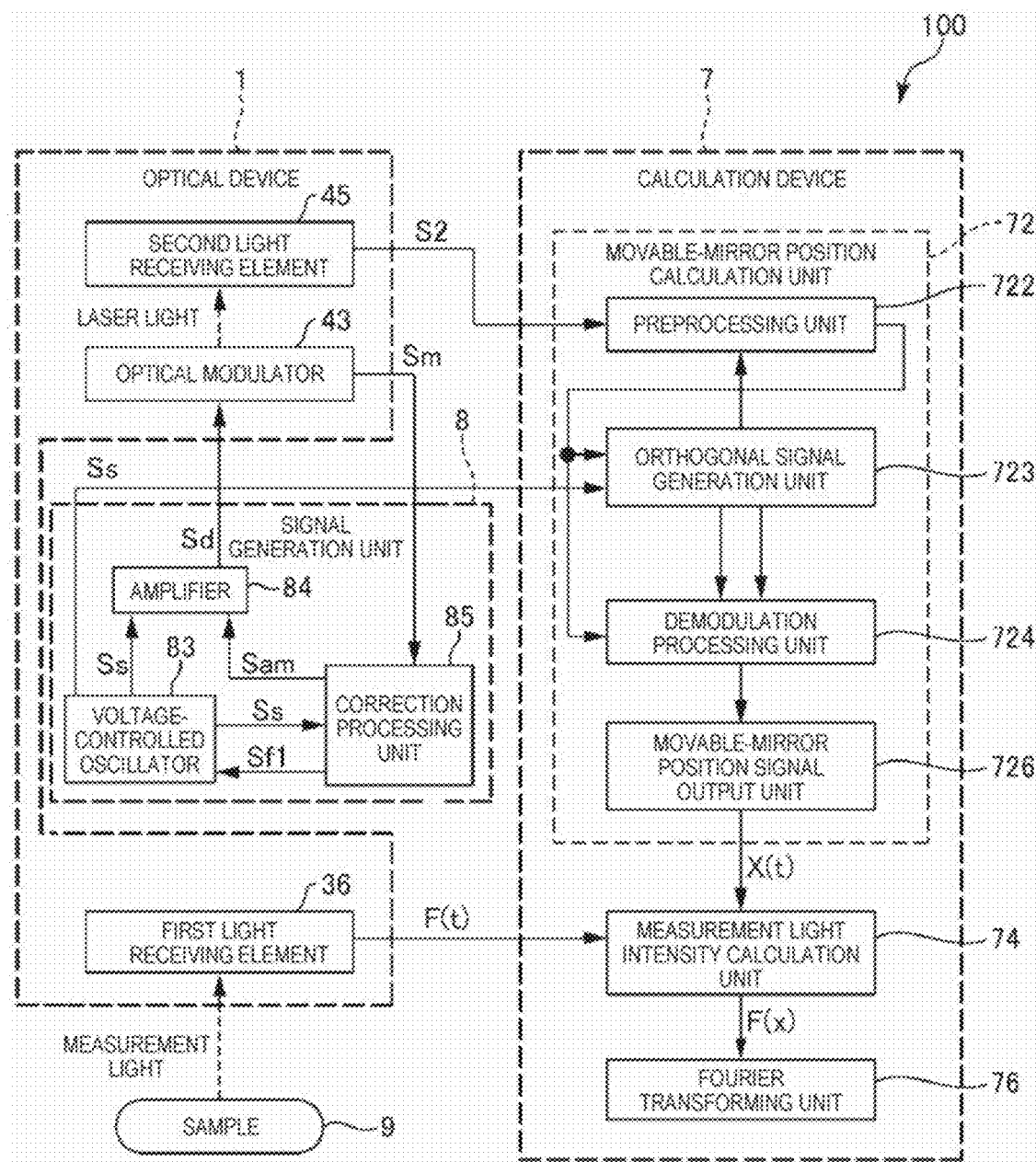
FIG. 12 is a schematic diagram illustrating main parts of an optical device, a signal generator, and a calculation device that are provided in a spectrometer according to a fifth modification of the first embodiment.

FIG. 12 is a schematic diagram illustrating main parts of the optical device 1, the signal generator 8, and the calculation device 7 provided in the spectrometer according to the fifth modification of the first embodiment.

The spectrometer 100 illustrated in FIG. 12 is the same as the spectrometer 100 illustrated in FIG. 2 except for a difference in configurations of the signal generator 8 and the calculation device 7.

In the modification, as illustrated in FIG. 12, the signal generator 8 includes a voltage-controlled oscillator 83, an amplifier 84, and a correction processing unit 85. The calculation device 7 includes the mirror position calculator 72, the measurement light intensity calculator 74, and the Fourier transformer 76. Further, the mirror position calculator 72 includes the preprocessing unit 722, an orthogonal signal generator 723, the demodulation processing unit 724, and the mirror position signal output unit 726.

6.1. Signal Generator

First, the signal generator 8 illustrated in FIG. 12 will be described.

6.1.1. Configuration of Signal Generator

The voltage-controlled oscillator (VCO) 83 has a function of controlling, based on a received voltage signal, a frequency of a periodic signal to be output. Accordingly, the voltage-controlled oscillator 83 generates the reference signal Ss having a target frequency, and outputs the reference signal Ss to the amplifier 84, the correction processing unit 85, and the calculation device 7. The voltage-controlled oscillator 83 is not limited to VCO as long as the voltage-controlled oscillator 83 is an oscillator capable of adjusting a frequency of a periodic signal to be output.

The amplifier 84 has a function of controlling, based on a received control signal, an amplitude of the periodic signal to be output. Accordingly, the amplifier 84 amplifies the received reference signal Ss, generates the drive signal Sd having a target amplitude, and outputs the drive signal Sd to the optical modulator 43.

As illustrated in FIG. 12, the reference signal Ss output from the voltage-controlled oscillator 83 and an output signal Sm output correspondingly to the drive of the optical modulator 43 are input to the correction processing unit 85. In addition, the correction processing unit 85 outputs a frequency control signal Sf1 (correction signal) to the voltage-controlled oscillator 83. Further, the correction processing unit 85 outputs an amplification factor control signal Sam (correction signal) to the amplifier 84.

The correction processing unit 85 is mounted on, for example, an FPGA, and is preferably disposed in the vicinity of the optical modulator 43. Accordingly, a physical distance between the optical modulator 43 and the correction processing unit 85 can be reduced, and for example, a decrease in S/N ratio of the output signal Sm caused by influence of electromagnetic noise can be prevented.

Figure 13:
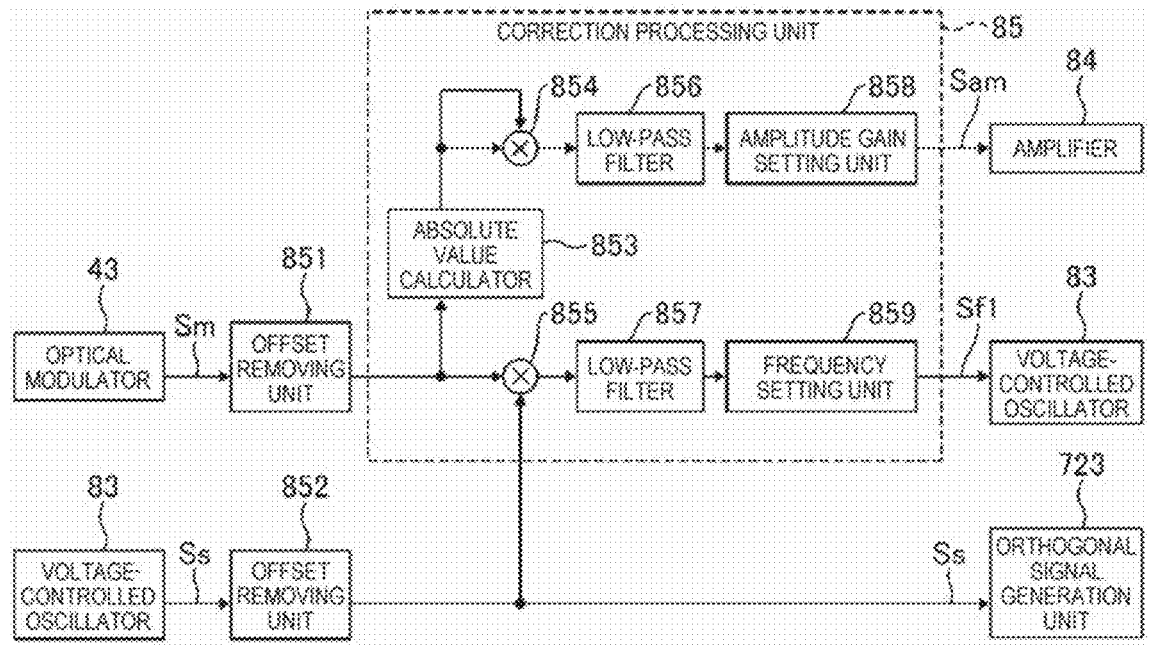
FIG. 13 is a diagram illustrating details of a correction processing unit in the schematic diagram of FIG. 12.

FIG. 13 is a diagram illustrating details of the correction processing unit 85 in the schematic diagram of FIG. 12. The output signal Sm from the optical modulator 43 is input to an offset removing unit 851 shown in FIG. 13. The offset removing unit 851 has a function of removing a direct current (DC) component and extracting an alternating current (AC) component. The output signal Sm passing through the offset removing unit 851 is input to the correction processing unit 85.

The reference signal Ss from the voltage-controlled oscillator 83 is input to an offset removing unit 852 shown in FIG. 13. The offset removing unit 852 has a function of removing a direct current (DC) component and extracting an alternating current (AC) component. The reference signal Ss passing through the offset removing unit 852 is input to the correction processing unit 85 and the orthogonal signal generator 723.

The correction processing unit 85 illustrated in FIG. 13 includes an absolute value calculator 853, a multiplier 854, a multiplier 855, a low-pass filter 856, a low-pass filter 857, an amplitude gain setting unit 858, and a frequency setting unit 859.

The absolute value calculator 853 calculates an absolute value of the output signal Sm that passes through the offset removing unit 851.

The multipliers 854 and 855 are circuits each of which outputs a signal proportional to a product of two input signals. In the multiplier 854, both of two input signals are the output signal Sm. Therefore, the multiplier 854 outputs a signal proportional to a square of the output signal Sm. On the other hand, in the multiplier 855, two input signals are the output signal Sm and the reference signal Ss. Therefore, the multiplier 855 outputs a signal proportional to a product of the output signal Sm and the reference signal Ss.

The multipliers 854 and 855 may be, for example, an element such as a Gilbert cell, or may be a circuit that performs addition and subtraction after logarithmically converting two input signals with an operational amplifier or the like, and thereafter performs inverse logarithmic conversion.

The low-pass filters 856 and 857 are filters that cut off a signal in a high frequency band for the input signal. A transmission frequency band of the low-pass filters 856 and 857 may be any band in which a frequency equal to or higher than twice the frequency of the drive signal Sd can be removed, and is preferably a band in which a frequency equal to or higher than the frequency of the drive signal Sd can be removed.

The signal output from the multiplier 854 and passing through the low-pass filter 856 becomes a signal having a value corresponding to an amplitude of the output signal Sm, as will be described later. Based on the signal, the amplitude gain setting unit 858 has a function of obtaining an amplitude (target amplitude) to be set for the drive signal Sd. The amplitude gain setting unit 858 controls a gain (an amplification factor) to be set in the amplifier 84 of the signal generator 8 such that the amplitude of the drive signal Sd is the target amplitude. Examples of a control logic include feedback control such as PI control and PID control. The amplitude gain setting unit 858 outputs, to the amplifier 84, the amplification factor control signal Sam corresponding to the gain to be set.

The amplifier 84 amplifies the amplitude of the drive signal Sd based on the amplification factor control signal Sam. Accordingly, the amplitude of the drive signal Sd is corrected.

The signal output from the multiplier 855, passing through the low-pass filter 857 and input to the frequency setting unit 859 becomes a signal having a value corresponding to a phase difference between the output signal Sm and the reference signal Ss, as will be described later. Here, a phase of the output signal Sm corresponds to a phase of the drive signal Sd. The phase of the drive signal Sd corresponds to a phase of the reference signal Ss. Therefore, the frequency setting unit 859 has a function of obtaining a frequency (target frequency) to be set for the reference signal Ss. The frequency setting unit 859 controls a voltage to be set in the voltage-controlled oscillator 83 of the signal generator 8 such that a frequency of the reference signal Ss is the target frequency. Examples of a control logic include feedback control such as PI control and PID control. The frequency setting unit 859 outputs, to the voltage-controlled oscillator 83, a frequency control signal Sf1 corresponding to the frequency to be set.

The voltage-controlled oscillator 83 generates the reference signal Ss having a frequency corresponding to the frequency control signal Sf1. Accordingly, the frequency of the reference signal Ss is corrected. Accordingly, the frequency of the drive signal Sd is also corrected.

6.1.2. Acquisition of Output Signal from Optical Modulator

Figure 14:
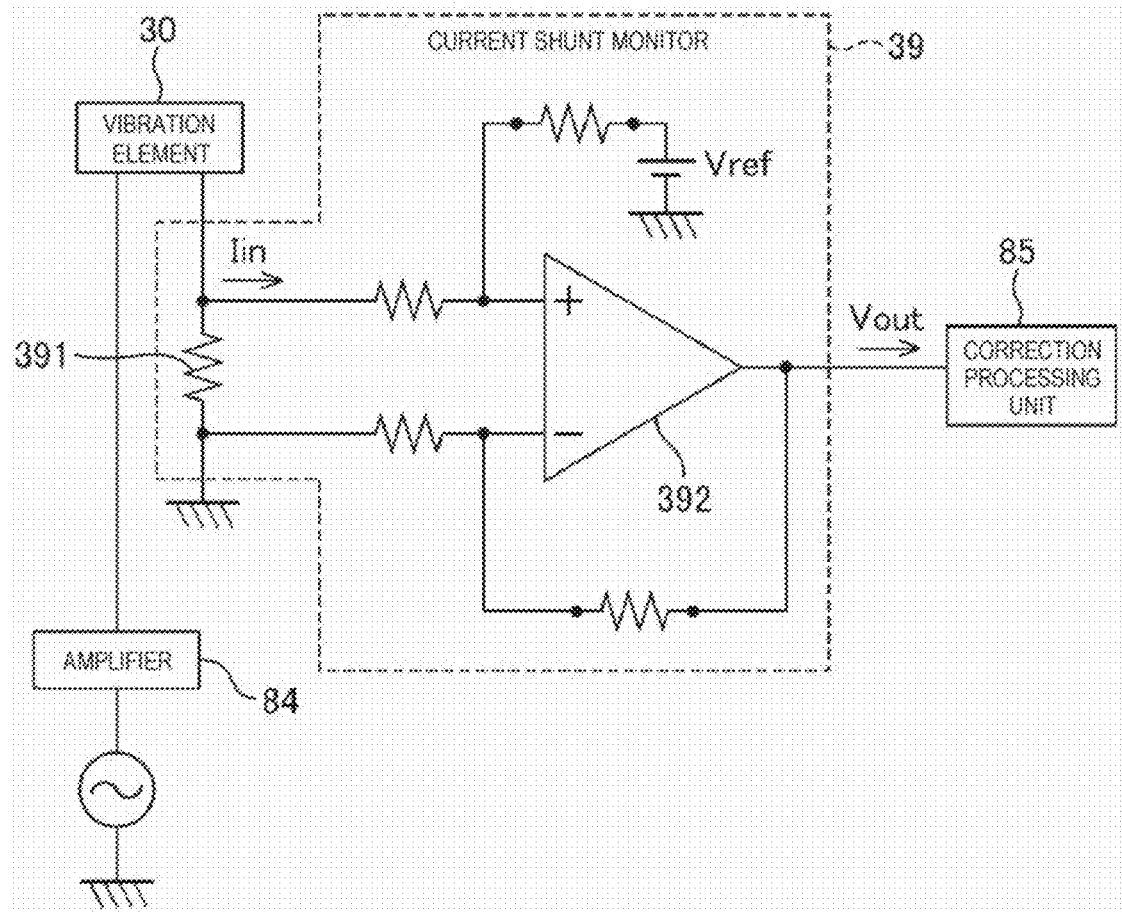
FIG. 14 is a diagram illustrating an example of a circuit that acquires an output signal from an optical modulator.

FIG. 14 is a diagram illustrating an example of a circuit that acquires the output signal Sm from the optical modulator 43.

The output signal Sm may be a signal obtained by detecting a current flowing through the vibrator 30 provided in the optical modulator 43, or may be a signal obtained by detecting a voltage applied to the vibrator 30. For example, when the signal obtained by detecting a current flowing through the vibrator 30 is set as the output signal Sm, as illustrated in FIG. 14, a value of the current flowing through the vibrator 30 is detected using a current shunt monitor 39. The current shunt monitor 39 shown in FIG. 14 includes a shunt resistor 391 and an operational amplifier 392, and converts the value of the current flowing through the vibrator 30 into a voltage value for detection. Accordingly, the output signal Sm, which is a voltage signal, is obtained. The obtained output signal Sm is converted into a digital signal and is output to the correction processing unit 85.

Examples of a method for detecting the current flowing through the vibrator 30 include a method using a Hall element and a method of detecting an electromotive force by winding a coil around a current path, in addition to the above-described method.

6.1.3. Correction Processing

Next, correction processing of the correction processing unit 85 will be described. The correction processing refers to changing set values of the voltage-controlled oscillator 83 and the amplifier 84 based on a correction signal output from the correction processing unit to correct the drive signal Sd and the reference signal Ss.

When the output signal Sm from the optical modulator 43 is, for example, a voltage signal, the output signal Sm before passing through the offset removing unit 851 is expressed by the following formula (II).

$$V_{QOM} = A_m \sin(\omega_m t + \alpha_{m1}) + O_{QOM} \tag{II}$$

In formula (II), $V_{QOM}$ is a voltage value of the output signal Sm. In addition, $A_m$ is a coefficient corresponding to the amplitude of the output signal Sm, and $\alpha_{m1}$ is a phase difference between the output signal Sm and the reference signal Ss and satisfies $\pi/2 < \alpha_{m1} < \pi/2$. Further, $O_{QOM}$ is a DC component of the output signal Sm.

Accordingly, the output signal Sm after passing through the offset removing unit 851 is expressed by the following formula (II-1).

$$V_{QOM} = A_m \sin(\omega_m t + \alpha_{m1}) \tag{II-1}$$

On the other hand, the reference signal Ss before passing through the offset removing unit 852 is represented by the following formula (III).

$$V_{OSC} = v_{OSC} \cos(\omega_m t) + O_{OSC} \tag{III}$$

In the formula (III), $V_{OSC}$ is a voltage value of the reference signal Ss. In addition, $v_{OSC}$ is a coefficient corresponding to an amplitude of the reference signal Ss, and $O_{OSC}$ is a DC component of the reference signal Ss.

Accordingly, the reference signal Ss after passing through the offset removing unit 852 is expressed by the following formula (III-1).

$$V_{OSC} = v_{OSC} \cos(\omega_m t) \tag{III-1}$$

The output signal Sm passing through the offset removing unit 851 is divided into two signals. One output signal Sm is squared by the multiplier 854 after passing through the absolute value calculator 853, and a result thereof is expressed by the following formula (II-2).

$$V_{QOM}^2 = \frac{A_m^2}{2}\{1 - \cos(2\omega_m t + 2\alpha_{m1})\} \tag{II-2}$$

Thereafter, by passing through the low-pass filter 856, only the first term on the right side of the above formula (II-2) is extracted. Accordingly, the output signal Sm after passing through the low-pass filter 856 is expressed by the following formula (II-3).

$$V_{QOM}^2 = \frac{A_m^2}{2} \tag{II-3}$$

As expressed by the above formula (II-3), an input signal $V_{QOM}^2$ input to the amplitude gain setting unit 858 is a signal that does not change with time. Therefore, the amplitude gain setting unit 858 performs feedback control using, as a control target value, a value obtained by substituting a target coefficient $A_m$ into the above formula (II-3) for the output signal Sm represented by the above formula (II-3). Then, the amplification factor control signal Sam corresponding to the control target value is output to the amplifier 84 of the signal generator 8. Accordingly, a gain of the amplitude in the amplifier 84 can be changed to correct the amplitude of the drive signal Sd to the target amplitude.

The other of the two divided output signals Sm is multiplied by the reference signal Ss by the multiplier 855. Accordingly, the signal output from the multiplier 855 is expressed by the following formula (IV).

$$V_{QOM} \cdot V_{OSC} = \frac{A_m v_{OSC}}{2}\{\sin(\alpha_{m1}) + \sin(2\omega_m t + \alpha_{m1})\} \tag{IV}$$

Thereafter, by passing through the low-pass filter 857, only the first term on the right side of the above formula (IV) is extracted. Accordingly, the output signal Sm after passing through the low-pass filter 857 is expressed by the following formula (IV-2).

$$V_{QOM} \cdot V_{OSC} = \frac{A_m v_{OSC}}{2}\sin(\alpha_{m1}) \tag{IV-2}$$

As expressed by the above formula (IV-2), the input signal $V_{QOM} \cdot V_{OSC}$ input to the frequency setting unit 859 is a signal including the coefficient $A_m$, the coefficient $v_{OSC}$, and the phase difference $\alpha_{m1}$ on the right side. Among them, the coefficient $v_{OSC}$ is known. On the other hand, the coefficient $A_m$ is controlled so as to satisfy $0 < A_m$ and converge to the target coefficient $A_m$ as described above. Therefore, the input signal $V_{QOM} \cdot V_{OSC}$ is also a signal that does not change with time. Therefore, the frequency setting unit 859 performs feedback control using, as a control target value, a value obtained by substituting the target phase difference $\alpha_{m1}$ into the above formula (IV-2), for example. Then, the frequency control signal Sf1 corresponding to the control target value is output to the voltage-controlled oscillator 83 of the signal generator 8. Accordingly, the frequency of the reference signal Ss output from the voltage-controlled oscillator 83 can be changed to correct the frequency of the reference signal Ss to the target frequency. The frequency of the drive signal Sd can also be corrected to a target frequency.

The target phase difference $\alpha_{m1}$ can be determined based on, for example, a relationship of the phase difference between the drive signal Sd and the output signal Sm in the vibrator 30 that vibrates at a mechanical resonance frequency. Specifically, it is known that in such a vibrator 30, the phase of the output signal Sm is delayed by about 90 [deg] with respect to the input drive signal Sd. In addition, in a process until the output signal Sm is input to the correction processing unit 85, a phase delay $\delta$ [deg] may occur. In consideration of these facts, the target phase difference $\alpha_{m1}$ can be, for example, 90+$\delta$ [deg]. The phase delay $\delta$ can be obtained by an experiment or simulation.

When a temperature change or the like occurs, the mechanical resonance frequency may change, and efficiency of converting input power of the vibrator 30 into vibration may change. When the conversion efficiency changes, an amplitude of the vibration of the vibrator 30 changes. Therefore, in the correction processing, first, the frequency of the reference signal Ss and the frequency of the drive signal Sd are preferentially corrected. Thereafter, the amplitude of the drive signal Sd is corrected as necessary. By executing the correction processing in such an order, the frequency and the amplitude can be efficiently controlled to respective target values.

In view of the control in the frequency setting unit 859 described above, it is desirable to converge the control of the signal input to the amplitude gain setting unit 858 earlier than the control of the signal input to the frequency setting unit 859. Accordingly, instability of the target control value in the frequency setting unit 859 is prevented, and thus instability of the correction processing can be prevented.

Each of the amplitude gain setting unit 858 and the frequency setting unit 859 is constructed by combining operational amplifiers and the like so as to perform, for example, a feedback control operation such as PID control. In this case, in order to converge the control of the signal input to the amplitude gain setting unit 858 earlier than the control of the signal input to the frequency setting unit 859, a crossing frequency of an open-loop transfer function of a control loop in the operation of the amplitude gain setting unit 858 may be set higher than a crossing frequency of an open-loop transfer function of a control loop in the operation of the frequency setting unit 859.

By performing the correction processing as described above, the following effects are obtained.

When the mechanical resonance frequency of the vibrator 30 changes under the influence of disturbance such as an ambient temperature change, a gravity change, vibration, and noise, the frequency and amplitude of the vibration of the vibrator 30 change, and the S/N ratio of the modulation signal decreases. Accordingly, demodulation accuracy of a sample signal decreases.

On the other hand, by performing the correction processing as described above, the frequency and the amplitude of the vibration of the vibrator 30 can be maintained constant even when disturbance such as a temperature change is applied. That is, even when disturbance such as a temperature change is applied, the frequency and the amplitude of the vibration of the vibrator 30 can be corrected so as not to change. Accordingly, a decrease in S/N ratio of the second modulation signal can be prevented. As a result, even when the disturbance such as a temperature change is applied, accuracy of the preprocessing and the demodulation processing in the calculation device 7 can be improved, and the measurement error $\Delta d$ of the position of the movable mirror 33 can be reduced.

Unlike the driving by the oscillation circuit, even when the mechanical resonance frequency changes due to the disturbance such as a temperature change, the frequency of the drive signal Sd can be made to follow the change, and thus the vibrator 30 can be continuously driven at a frequency near the mechanical resonance frequency of the vibrator 30. Accordingly, driving efficiency of the vibrator 30 increases, and thus the power consumption of the optical device 1 can be reduced.

6.2. Calculation Device

Next, the calculation device 7 shown in FIG. 12 will be described.

The calculation device 7 shown in FIG. 12 includes the mirror position calculator 72, the measurement light intensity calculator 74, and the Fourier transformer 76. Further, the mirror position calculator 72 includes the preprocessing unit 722, an orthogonal signal generator 723, the demodulation processing unit 724, and the mirror position signal output unit 726.

The orthogonal signal generator 723 has a function of generating a cosine wave signal and a sine wave signal, which are waveforms orthogonal to each other, based on the reference signal Ss output from the signal generator 8 and the signal output from the preprocessing unit 722. In the following description, the cosine wave signal and the sine wave signal are also collectively referred to as an orthogonal signal. The generated orthogonal signal is used for demodulation processing in the demodulation processing unit 724. Further, the cosine wave signal is fed back to the preprocessing unit 722 to adjust a phase of the signal output from the preprocessing unit 722. Accordingly, a decrease in the accuracy of the demodulation processing accompanying the phase shift is prevented, and the measurement error $\Delta d$ of the position of the movable mirror 33 can be reduced.

The orthogonal signal generator 723 may be provided as necessary, and may be omitted. In this case, it is sufficient that the reference signal Ss and the signal obtained by shifting the phase of the reference signal Ss by $\pi/2$ are used as orthogonal signals.

7. Sixth Modification of First Embodiment

Next, a spectrometer according to a sixth modification of the first embodiment will be described.

Figure 15:
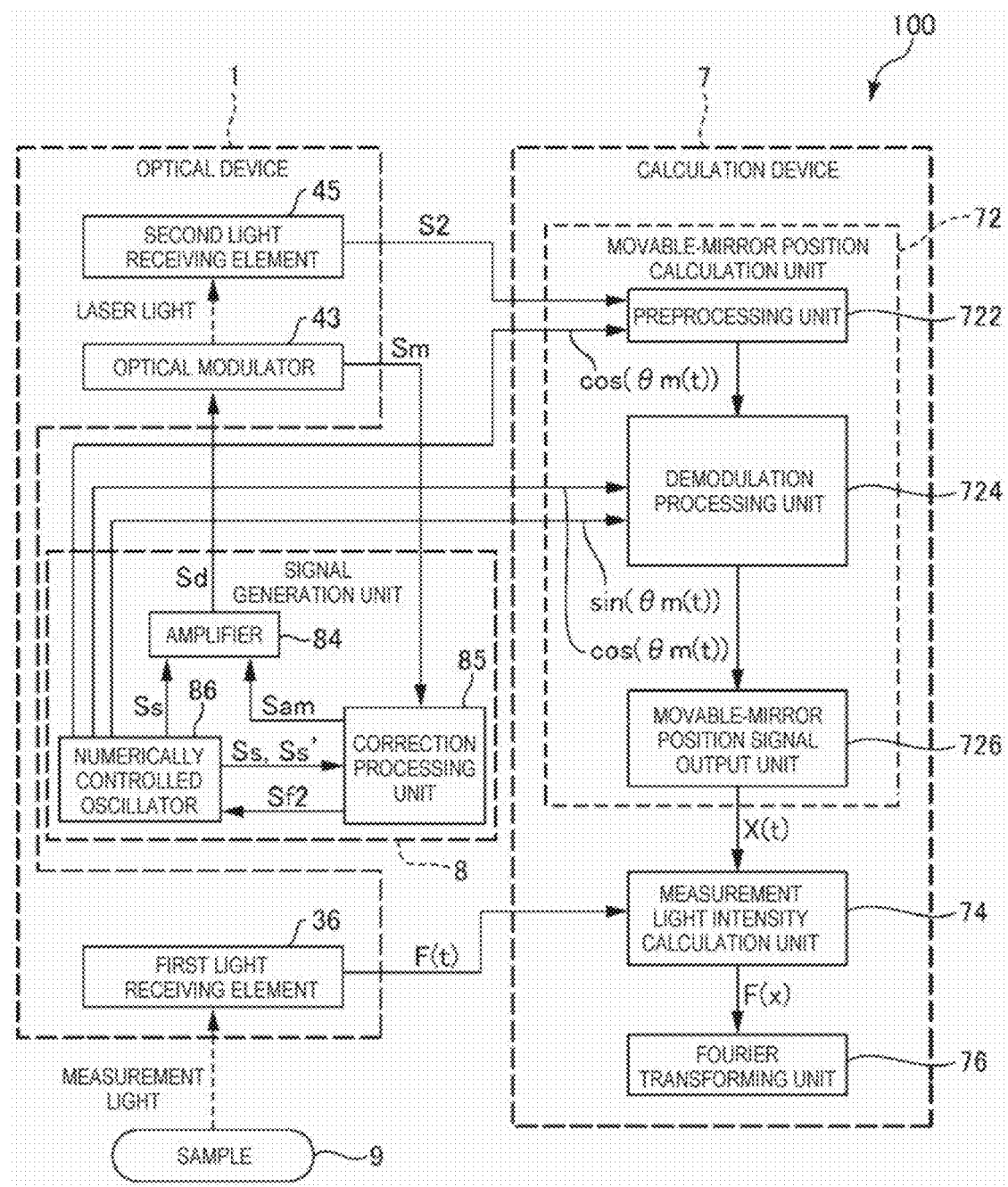
FIG. 15 is a schematic diagram illustrating main parts of an optical device, a signal generator, and a calculation device that are provided in a spectrometer according to a sixth modification of the first embodiment.
Figure 16:
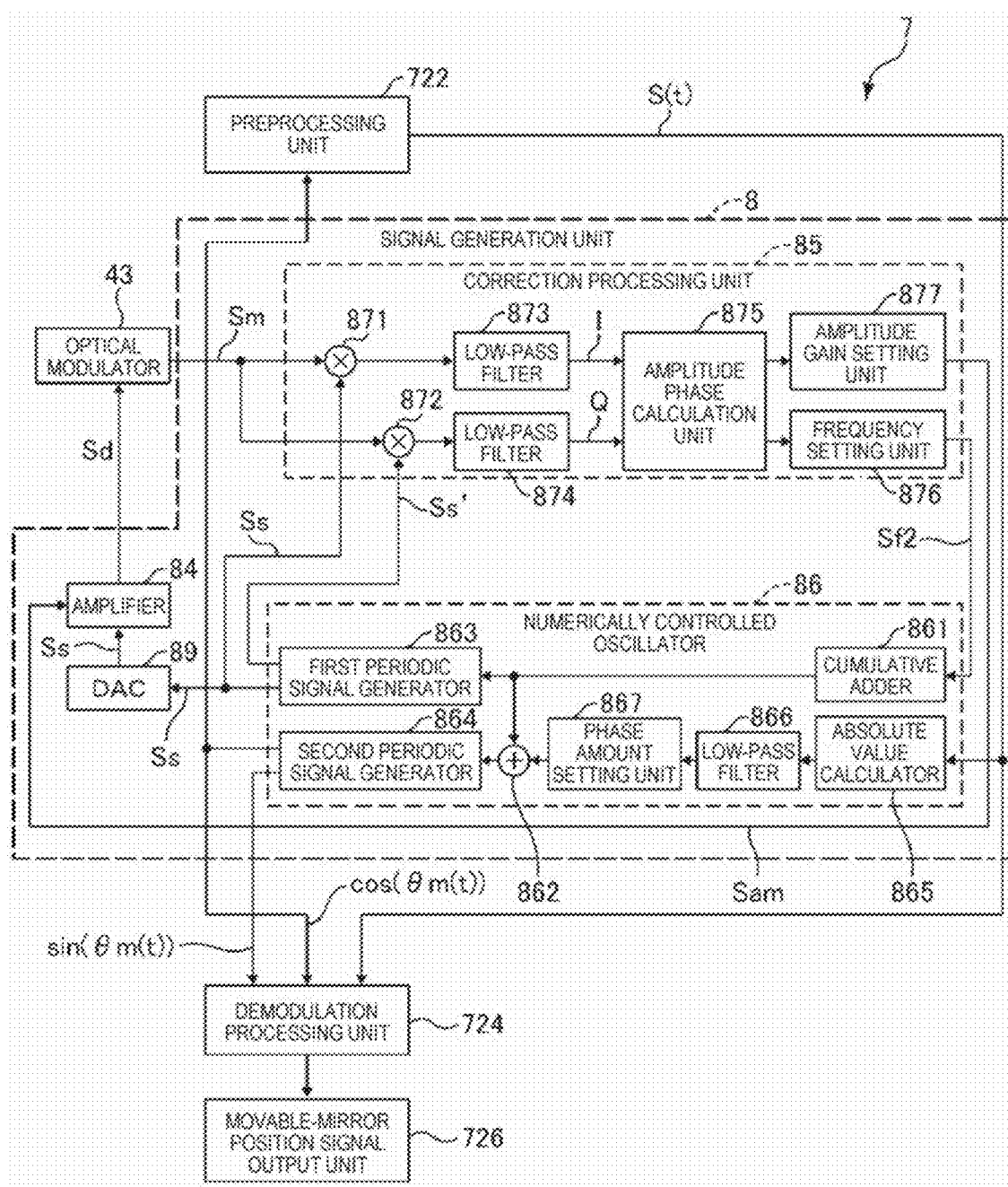
FIG. 16 is a diagram illustrating details of the signal generator in the schematic diagram of FIG. 15.

FIG. 15 is a schematic diagram illustrating main parts of the optical device 1, the signal generator 8, and the calculation device 7 provided in the spectrometer according to the sixth modification of the first embodiment. FIG. 16 is a diagram illustrating details of the signal generator 8 in the schematic diagram of FIG. 15.

The spectrometer 100 illustrated in FIG. 15 is the same as the spectrometer 100 illustrated in FIG. 2 except that configurations of the signal generator 8 are different.

In the modification, as illustrated in FIG. 16, the signal generator 8 includes a numerically controlled oscillator 86, a DAC 89, the amplifier 84, and the correction processing unit 85. As illustrated in FIG. 16, the correction processing unit 85 includes multipliers 871 and 872, a low-pass filter 873, a low-pass filter 874, an amplitude phase calculation unit 875, a frequency setting unit 876, and an amplitude gain setting unit 877.

7.1. Signal Generator

The signal generator 8 shown in FIG. 16 will be described.

The numerically controlled oscillator 86 generates a periodic signal such as a sine wave or a cosine wave by reading, from a ROM table that stores numerical values of a sine wave and a cosine wave for one period, data of an address to be added at regular clock intervals. Accordingly, the numerically controlled oscillator 86 generates the reference signal Ss having a target frequency with high accuracy and outputs the reference signal Ss to the DAC 89. The DAC 89 is a digital-to-analog converter, and generates the analog reference signal Ss based on the input digital reference signal Ss.

The numerically controlled oscillator 86 includes a cumulative adder 861, an absolute value calculator 865, a low-pass filter 866, a phase amount setting unit 867, an adder 862, a first periodic signal generator 863, and a second periodic signal generator 864.

The cumulative adder 861 cumulatively adds up a frequency control signal Sf2 output from the frequency setting unit 876 of the correction processing unit 85. The frequency control signal Sf2 is a phase lead amount per unit time step corresponding to the frequency to be set to the reference signal Ss, which will be described later. The cumulative adder 861 cumulatively adds up the phase lead amounts, and calculates a cumulative addition value. The obtained cumulative addition value is output to the first periodic signal generator 863.

The first periodic signal generator 863 includes a read only memory (ROM) that stores numerical values of a sine wave and a cosine wave for one period. In the first periodic signal generator 863, an address numerical value corresponding to the cumulative addition value is read. Accordingly, a sine wave signal and a cosine wave signal each having a frequency corresponding to the frequency control signal Sf2 can be generated. The cosine wave signal is output as the reference signal Ss to the DAC 89 and the multiplier 871 of the correction processing unit 85. The sine wave signal is output as a reference signal Ss' to the multiplier 872 of the correction processing unit 85.

The absolute value calculator 865 calculates an absolute value of the preprocessed signal S(t) output from the preprocessing unit 722. A calculation result is input to the phase amount setting unit 867 via the low-pass filter 866.

As described above, the phase amount setting unit 867 sets a phase amount a to be added to the cumulative addition value by the adder 862. The adder 862 calculates a sum of the cumulative addition value and the phase amount a. The obtained sum of the cumulative addition value and the phase amount a is output to the second periodic signal generator 864.

The second periodic signal generator 864 includes a read only memory (ROM) that stores numerical values of a sine wave and a cosine wave for one period. In the second periodic signal generator 864, an address numerical value corresponding to the sum of the cumulative addition value and the phase amount a is read. Accordingly, a sine wave signal $\sin(\theta_m(t))$ and a cosine wave signal $\cos(\theta_m(t))$ to which a phase offset of the phase amount a is added can be generated at a frequency corresponding to the frequency control signal Sf2. The cosine wave signal $\cos(\theta_m(t))$ is output to the preprocessing unit 722 and the demodulation processing unit 724 to be described later, and the sine wave signal $\sin(\theta_m(t))$ is output to the demodulation processing unit 724.

Although the configuration example of the numerically controlled oscillator 86 is described above, the configuration of the numerically controlled oscillator 86 is not limited thereto.

7.2. Correction Processing Unit

As illustrated in FIG. 15, the output signal Sm that is output in response to driving of the optical modulator 43 is input to the correction processing unit 85. The correction processing unit 85 acquires the amplitude of the output signal Sm and the phase difference between the output signal Sm and the reference signal Ss by quadrature detection.

The correction processing unit 85 has a function of outputting the frequency control signal Sf2 (a correction signal) to the numerically controlled oscillator 86 and a function of outputting the amplification factor control signal Sam (a correction signal) to the amplifier 84.

The output signal Sm from the optical modulator 43 is converted into a digital signal, and then split into two signals as illustrated in FIG. 16. One output signal Sm is multiplied by the reference signal Ss by the multiplier 871. A signal output from the multiplier 871 passes through the low-pass filter 873 and is input to the amplitude phase calculation unit 875 as a signal I. The other output signal Sm is multiplied by the reference signal Ss' by the multiplier 872. A signal output from the multiplier 872 passes through the low-pass filter 874 and is input to the amplitude phase calculation unit 875 as a signal Q.

A transmission frequency band of the low-pass filter 873 and the low-pass filter 874 is preferably a band in which a frequency equal to or higher than the frequency of the drive signal Sd can be removed.

The amplitude phase calculation unit 875 calculates a $\tan(Q/I)$ to calculate a phase of the output signal Sm. The amplitude phase calculation unit 875 outputs the phase difference between the output signal Sm and the reference signal Ss to the frequency setting unit 876. The amplitude phase calculation unit 875 calculates $(I^2+Q^2)^{1/2}$ to calculate an amplitude of the output signal Sm. The amplitude phase calculation unit 875 outputs the calculated amplitude to the amplitude gain setting unit 877. As the amplitude phase calculation unit 875, for example, a coordinate rotation digital computer (CORDIC) which is a demodulation circuit is used, and the invention is not limited thereto.

The frequency setting unit 876 has a function of obtaining a target frequency of the reference signal Ss. The frequency setting unit 876 controls the frequency control signal Sf2 such that the frequency of the reference signal Ss is the target frequency, and outputs the frequency control signal Sf2 to the numerically controlled oscillator 86.

The numerically controlled oscillator 86 generates the reference signal Ss based on the frequency control signal Sf2. Accordingly, the frequency of the reference signal Ss is corrected.

The amplitude gain setting unit 877 has a function of obtaining a target amplitude of the drive signal Sd. The amplitude gain setting unit 877 controls the amplification factor control signal Sam such that the amplitude of the drive signal Sd is the target amplitude, and outputs the amplification factor control signal Sam to the amplifier 84.

The amplifier 84 amplifies the amplitude of the drive signal Sd based on the amplification factor control signal Sam. Accordingly, the amplitude of the drive signal Sd is corrected.

By performing the correction processing as described above, the following effects are obtained.

Even when disturbance such as a temperature change is applied, the frequency and the amplitude of the drive signal Sd can be made to follow a change in the mechanical resonance frequency and the vibration amplitude of the vibrator 30. Accordingly, the frequency and amplitude of the vibration of the vibrator 30 can be maintained constant. As a result, a decrease in S/N ratio of the second modulation signal can be prevented. As a result, even when disturbance is applied, the measurement error Δd of the position of the movable mirror 33 can be reduced.

Unlike the driving by an oscillation circuit, the vibrator 30 can be driven at a frequency near the mechanical resonance frequency of the vibrator 30, and thus the power consumption of the optical device 1 can be reduced.

In the embodiment, the correction processing unit 85 acquires the phase difference between the output signal Sm and the reference signal Ss and the amplitude of the output signal Sm by the quadrature detection. With the quadrature detection, the phase difference and the amplitude can be instantaneously acquired. Therefore, the correction processing can be performed in real time.

In the embodiment, the signal generator 8 includes the numerically controlled oscillator 86. According to the numerically controlled oscillator 86, the periodic signal can be generated based on a numerical value read from the ROM table. Therefore, the numerically controlled oscillator 86 can output the reference signals Ss and Ss', the cosine wave signal $\cos(\theta_m(t))$, and the sine wave signal $\sin(\theta_m(t))$ with high accuracy without being affected by noise or the like. Accordingly, the accuracy of the preprocessing and the demodulation processing in the calculation device 7 can be particularly improved.

8. Second Embodiment

Next, a spectrometer according to a second embodiment will be described.

Figure 17:
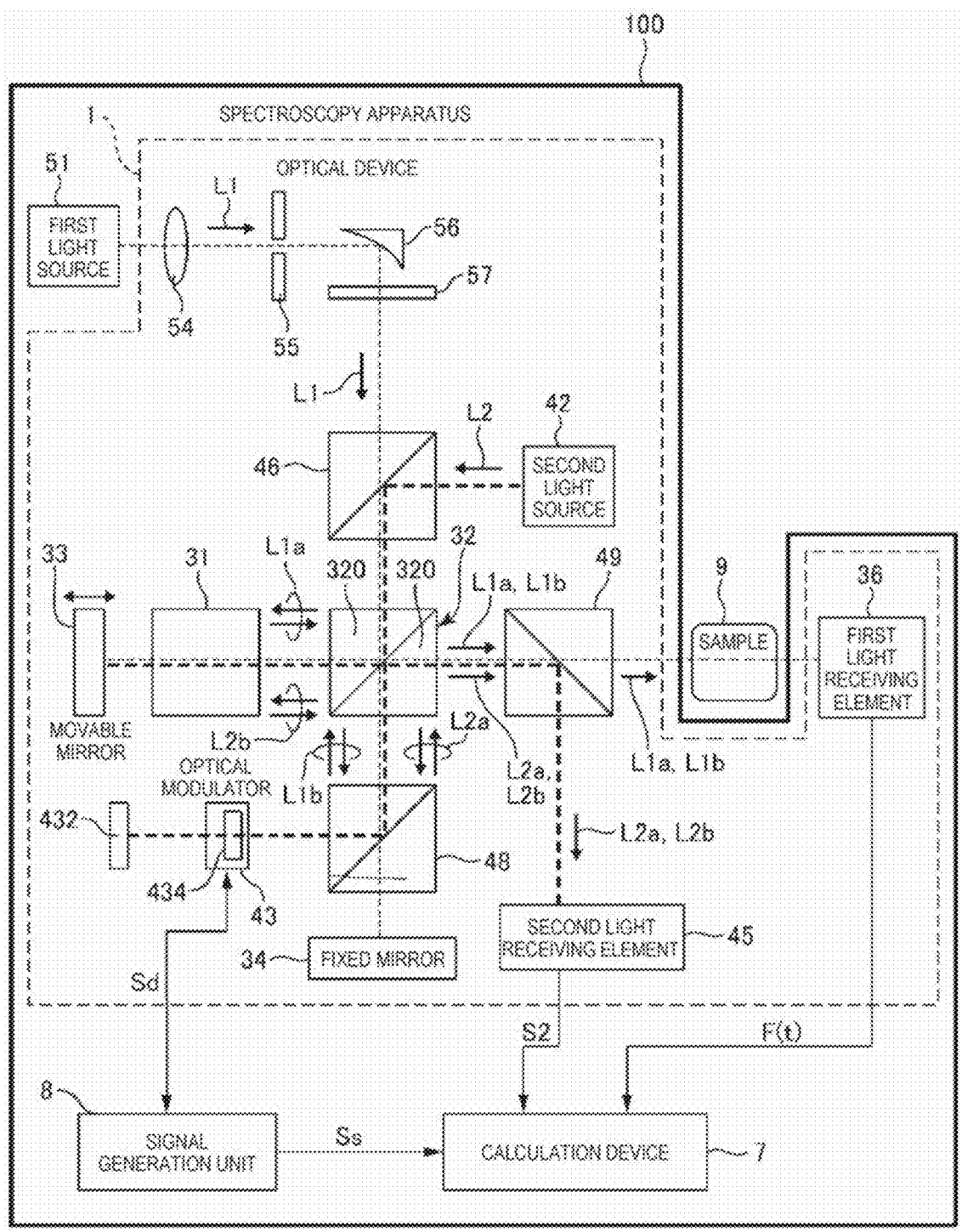
FIG. 17 is a schematic configuration diagram illustrating a schematic configuration of a spectrometer according to a second embodiment.

FIG. 17 is a schematic configuration diagram illustrating a schematic configuration of a spectrometer 100 according to the second embodiment.

Hereinafter, the second embodiment will be described, and in the following description, differences from the first embodiment will be mainly described, and a description of similar matters will be omitted.

The spectrometer 100 illustrated in FIG. 17 is the same as the spectrometer 100 illustrated in FIG. 1 except that configurations of the optical device 1 are different. Specifically, the optical modulator 43 provided in the optical device 1 illustrated in FIG. 17 differs from the optical modulator 43 provided in the spectrometer 100 illustrated in FIG. 1 in modulation method. Further, in the optical device 1 illustrated in FIG. 17, a mirror 432 that reflects the laser light L2a transmitted through the optical modulator 43 is added.

The optical modulator 43 illustrated in FIG. 17 includes an acousto-optic modulator 434 (AOM). When the laser light L2a passes through the acousto-optic modulator 434, the frequency thereof is shifted. Accordingly, the optical modulator 43 adds a second modulation signal to the laser light L2a. Instead of the acousto-optic modulator 434, an electro-optical modulator (EOM) may be used.

In the second embodiment, the same effects as those of the first embodiment can also be obtained. In the optical modulator 43 shown in FIG. 17, the laser light L2a passes twice, and the frequency thereof is shifted each time the laser light L2a passes. Therefore, for example, when the frequency of the laser light L2a is to be shifted by $f_M$ in the optical modulator 43 shown in FIG. 17, a shift amount of each time may be set to $f_M/2$.

9. Effects of Embodiments

As described above, the optical device 1 according to the embodiment includes the second light source 42, the beam splitter 32 (light splitter), the movable mirror 33 (first mirror), the fixed mirror 34 (second mirror), the dichroic mirror 48 (first color separator), the optical modulator 43, the first photodetector 36, and the second photodetector 45.

The second light source 42 emits the laser light L2 having a wavelength different from that of the measurement light L1 emitted from the first light source 51. The beam splitter 32 splits the measurement light L1 into first beam of the measurement light L1a and the second beam of the measurement light L1b and then mixes the first beam of the measurement light L1a and the second beam of the measurement light L1b, and splits the laser light L2 into first laser light beam L2b and the second laser light beam L2a and then mixes the first laser light beam L2b and the second laser light beam L2a. The movable mirror 33 moves with respect to the beam splitter 32, and reflects the first beam of the measurement light L1a and the first laser light beam L2b, thereby adding a first modulation signal to the first beam of the measurement light L1a and adding a displacement signal of the movable mirror 33 to the first laser light beam L2b. The fixed mirror 34 reflects the second beam of the measurement light L1b. The dichroic mirror 48 separates the second beam of the measurement light L1b from the second laser light beam L2a based on a difference in wavelength. The optical modulator 43 is driven based on the drive signal Sd, and adds a second modulation signal to the second laser light beam L2a after separation by the dichroic mirror 48. The first photodetector 36 receives the measurement light L1a and L1b that includes a sample-derived signal generated by interaction between the measurement light and the sample 9 and the first modulation signal, and outputs the first light reception signal F(t). The second photodetector 45 receives the laser light L2a and L2b that includes the displacement signal and the second modulation signal, and outputs the second light reception signal S2.

According to such a configuration, displacement of the movable mirror 33 can be grasped at an interval sufficiently narrower than a wavelength of the laser light L2 by a laser interferometer technique. Therefore, an intensity of the first light reception signal F(t) can be sampled at an interval shorter than that in the related art, and the optical device 1 capable of generating the interferogram F(x) having high position resolution can be obtained. Accordingly, spectral information having high wavenumber resolution or wavelength resolution can be acquired.

Further, since a measurement interval of the movable mirror 33 can be made smaller, the maximum measurement wavenumber in the spectral information can be made larger and the minimum measurement wavelength in the spectral information can be made shorter. Accordingly, the optical device 1 can contribute to implementation of the spectrometer 100 capable of acquiring the spectral information for a wider band.

Further, in the optical device 1, each of the measurement light L1 and the laser light L2 is split and mixed by the beam splitter 32, and the measurement light L1 and the laser light L2 are separated and synthesized by using the dichroic mirror 48. Accordingly, size reduction and weight reduction of the optical device 1 can be achieved.

In the optical device 1 according to the embodiment, the dichroic mirror 48 (first color separator) is disposed between the beam splitter 32 (light splitter) and the fixed mirror 34 (second mirror).

According to such a configuration, it is possible to effectively use a space between the beam splitter 32 and the fixed mirror 34 while sharing the beam splitter 32. Accordingly, it is possible to add the second modulation signal to the laser light L2a while saving space of the optical device 1. As a result, the size reduction and weight reduction of the optical device 1 can be achieved.

The dichroic mirror 48 may be disposed at a position different from the position described above. In this case, an optical component different from the dichroic mirror 48 may be added.

The optical device 1 according to the embodiment further includes the dichroic mirror 49 (second color separator). The dichroic mirror 49 is provided between the beam splitter 32 and the first photodetector 36, and separates the measurement light L1 and the laser light L2 from each other based on a difference in wavelength. The second photodetector 45 receives the laser light L2a and L2b after separation by the dichroic mirror 49.

According to such a configuration, it is possible to effectively use a space between the beam splitter 32 and the first photodetector 36 while sharing the beam splitter 32. Accordingly, it is possible to save space of the optical device 1. As a result, the size reduction and weight reduction of the optical device 1 can be achieved.

The dichroic mirror 49 may be omitted. In this case, for example, the second photodetector 45 may be disposed in the vicinity of the first photodetector 36, and the measurement light and the laser light may be received by both of the elements.

The optical device 1 according to the embodiment further includes the dichroic mirror 46 (third color separator). The dichroic mirror 46 is provided between the first light source 51 and the beam splitter 32 (light splitter), and based on a difference in wavelength, synthesizes the measurement light L1 and the laser light L2 that is emitted from the second light source 42.

According to such a configuration, it is possible to effectively use a space between the first light source 51 and the beam splitter 32 while sharing the beam splitter 32. Accordingly, it is possible to save space of the optical device 1. As a result, the size reduction and weight reduction of the optical device 1 can be achieved.

The dichroic mirror 46 may be omitted. In this case, for example, the second light source 42 may be disposed in the vicinity of the first light source 51.

Further, in the optical device 1 according to the embodiment, the beam splitter 32 (light splitter) may be a prism element or a stacked element. The prism element includes the two prisms 320 and 320, and an optical thin film sandwiched between the prisms 320. The stacked element includes the two transparent flat plates 322 and 322, and the optical thin film 324 sandwiched between the transparent flat plates 322. The optical device 1 includes the wavelength dispersion compensation plate 31. The wavelength dispersion compensation plate 31 is provided between the beam splitter 32 and the movable mirror 33, and compensates wavelength dispersion of one beam that is the measurement light L1a.

Accordingly, no difference in optical path length occurs between transmitted light and reflected light in the beam splitter 32, and thus there is no need to provide, between the beam splitter 32 and the fixed mirror 34, an optical component that compensates wavelength dispersion accompanying the difference in the optical path length. As a result, an increase in the number of components in the optical device 1 can be avoided. In addition, since the optical thin film is not exposed in these types of components, it is possible to contribute to improvement in long-term reliability of the beam splitter 32. The beam splitter 32 may be an element other than these types of elements.

Further, in the optical device 1 according to the embodiment, the beam splitter 32 (light splitter) and the dichroic mirror 48 (first color separator) may each be a plate element that includes a transparent flat plate having a front surface and a back surface in a front and back relationship and an optical thin film formed at the front surface or the back surface of the transparent flat plate. The transparent flat plate 482 of the dichroic mirror 48 has a function of compensating wavelength dispersion of the other beam that is the measurement light L1b.

Accordingly, in the optical device 1, the wavelength dispersion can be compensated without increasing the number of components, and thus it is possible to prevent the wavelength dispersion from eventually affecting an interferogram or the spectral information.

In the optical device 1 according to the embodiment, it is preferable that the optical modulator 43 includes the vibrator 30. The vibrator 30 is an element that vibrates based on the drive signal Sd. The optical modulator 43 adds the second modulation signal by reflecting the laser light L2a by the vibrating vibrator 30.

According to such a configuration, the size reduction, weight reduction, and power consumption reduction of the optical device 1 can be achieved. Therefore, the optical device 1 and the spectrometer 100 having excellent portability can be implemented.

In the optical device 1, the vibrator 30 is preferably a quartz crystal vibrator, a silicon vibrator, or a ceramic vibrator. Unlike other vibrators such as a piezo element, the vibrators are vibrators using a resonance phenomenon, and thus have a high Q value and can easily stabilize a natural frequency. Therefore, an S/N ratio of the second modulation signal can be increased.

In the optical device 1, a moving distance of the movable mirror 33 (first mirror) is preferably 200 mm or less. Accordingly, the measurement error Δd of the movable mirror 33 can be particularly reduced. As a result, the optical device 1 capable of generating the interferogram F(x) having a wider band with higher resolution can be implemented.

When the measurement light L1 is light having a first wavelength, the optical device 1 preferably includes the light-attenuating filter 66 that attenuates light having the first wavelength.

Accordingly, since the light having the first wavelength is prevented from being incident on the second photodetector 45, the second photodetector 45 can output the second light reception signal S2 having a high S/N ratio even when an intensity of light including the sample-derived signal is weak.

The spectrometer 100 according to the embodiment includes the optical device 1 according to the embodiment, the signal generator 8, the mirror position calculator 72, the measurement light intensity calculator 74, and the Fourier transformer 76. The signal generator 8 outputs the drive signal Sd and the reference signal Ss. The mirror position calculator 72 performs calculation on the second light reception signal S2 based on the reference signal Ss to generate the mirror position signal X(t) indicating the position of the movable mirror 33 (the first mirror). The measurement light intensity calculator 74 generates a waveform (the interferogram F(x)) representing intensities of the first light reception signal F(t) at respective positions of the movable mirror 33 based on the first light reception signal F(t) and the mirror position signal X(t). The Fourier transformer 76 performs Fourier transform on the interferogram F(x) to acquire the spectral information.

According to such a configuration, the position of the movable mirror 33 can be grasped at an interval sufficiently narrower than the wavelength of the laser light L2 by the laser interferometer technique. Therefore, the intensity of the first light reception signal F(t) can be sampled at an interval shorter than that in the related art, and an interferogram having high resolution for a wide band can be generated. Accordingly, the spectrometer 100 capable of acquiring spectral information having high resolution for a wide band can be implemented.

In the spectrometer 100, the optical modulator 43 preferably includes the vibrator 30. The vibrator 30 is an element that vibrates based on the drive signal Sd. When the optical modulator 43 is configured to add the second modulation signal by reflecting the laser light L2 by the vibrating vibrator 30, the signal generator 8 may include the oscillation circuit 81 that operates using the vibrator 30 as a signal source.

According to such a configuration, the size reduction, weight reduction, and power consumption reduction of the optical device 1 can be achieved. Therefore, the spectrometer 100 excellent in portability can be implemented.

In the spectrometer 100, since the drive signal Sd and the reference signal Ss are generated by the oscillation circuit 81, the drive signal Sd and the reference signal Ss will be affected in the same way when subjected to disturbance. Therefore, the displacement signal, which corresponds to the position of the movable mirror 33 and is added via the optical modulator 43 driven based on the drive signal Sd, and the reference signal Ss are also affected in the same way. Therefore, when the displacement signal and the reference signal Ss are subjected to calculation in the calculation device 7, the influence of disturbance included in both can be balanced out or reduced in the process of calculation. As a result, in the calculation device 7, the position of the movable mirror 33 can be accurately obtained even under disturbance, and thus the spectrometer 100 having more excellent robustness can be implemented.

Although the optical device and the spectrometer according to the present disclosure have been described based on the embodiments illustrated in the drawings, the optical device and the spectrometer according to the present disclosure are not limited to the embodiments and the modifications thereof. The configuration of each unit may be replaced with any configuration having the same function, or any other component may be added. For example, the spectrometer according to the present disclosure may include a control device that controls operations of an optical device, a signal generator, a calculation device, and the like.

The optical device and the spectrometer according to the present disclosure may include two or more of the above-described embodiments and modifications thereof. Further, each functional unit provided in the optical device or the spectrometer according to the present disclosure may be divided into a plurality of components, or a plurality of functional units may be integrated into one.

What is claimed is:

1. An optical device, comprising:
a first light source configured to emit measurement light;
a second light source configured to emit laser light having a wavelength different from that of the measurement light emitted from the first light source;
a light splitter configured to split the measurement light into a first beam of the measurement light and a second beam of the measurement light and then mix the first beam of the measurement light and the second beam of the measurement light, and configured to split the laser light into a first laser light beam and a second laser light beam and then mix the first laser light beam and the second laser light beam;
a first mirror configured to move with respect to the light splitter, and reflect the first beam of the measurement light and the first laser light beam, thereby adding a first modulation signal to the first beam of the measurement light and adding a displacement signal to the first laser light beam;
a second mirror configured to reflect the second beam of the measurement light;
a first color separator configured to separate the second beam of the measurement light from the second laser light beam based on a difference in wavelength;
an optical modulator driven based on a drive signal and configured to add a second modulation signal to the second laser light beam after separation by the first color separator;
a first photodetector configured to receive the measurement light including the first modulation signal and a sample-derived signal derived from a sample, and to output a first light reception signal; and
a second photodetector configured to receive the laser light including the displacement signal and the second modulation signal and to output a second light reception signal.

2. The optical device according to claim 1, wherein the first color separator is disposed between the light splitter and the second mirror.

3. The optical device according to claim 1, further comprising:
a second color separator provided between the light splitter and the first photodetector and configured to separate the measurement light and the laser light from each other based on a difference in wavelength, wherein
the second photodetector receives the laser light after separation by the second color separator.

4. The optical device according to claim 1, further comprising:
a third color separator provided between the first light source and the light splitter and configured to synthesize, based on a difference in wavelength, the measurement light and the laser light emitted from the second light source.

5. The optical device according to claim 1, wherein the light splitter is a prism element including two prisms and an optical thin film sandwiched between the prisms, or a stacked element including two plates and an optical thin film sandwiched between the plates, and the optical device further comprises:

a wavelength dispersion compensation plate provided between the light splitter and the first mirror and configured to compensate wavelength dispersion of the first beam of the measurement light.

6. The optical device according to claim 1, wherein
each of the light splitter and the first color separator is a plate element including a transparent flat plate having a front surface and a back surface, and an optical thin film formed at the front surface of the transparent flat plate or the back surface of the transparent flat plate, and
the transparent flat plate of the first color separator compensates wavelength dispersion of the second beam of the measurement light.

7. The optical device according to claim 1, wherein
the optical modulator includes a vibrator configured to vibrate based on the drive signal, and adds the second modulation signal by the vibrator vibrating and reflecting the laser light.

8. The optical device according to claim 7, wherein
the vibrator is a crystal vibrator, a silicon vibrator, or a ceramic vibrator.

9. The optical device according to claim 1, wherein
a moving distance of the first mirror is 200 mm or less.

10. The optical device according to claim 1, wherein
the measurement light is light having a first wavelength, and
the optical device further comprises a light-attenuating filter configured to attenuate light having the first wavelength.

11. A spectrometer, comprising:
the optical device according to claim 1;
a signal generator configured to output the drive signal and a reference signal;
a mirror position calculator configured to generate a mirror position signal indicating a position of the first mirror based on the second light reception signal and the reference signal;
a measurement light intensity calculator configured to generate a waveform representing intensities of the first light reception signal at respective positions of the first mirror based on the first light reception signal and the mirror position signal; and
a Fourier transformer configured to perform Fourier transform on the waveform to acquire spectral information.

12. The spectrometer according to claim 11, wherein
the optical modulator includes a vibrator configured to vibrate based on the drive signal, and adds the second modulation signal by the vibrator vibrating and reflecting the laser light, and
the signal generator includes an oscillation circuit configured to operate using the vibrator as a signal source.

13. A spectrometer, comprising:
the optical device according to claim 2;
a signal generator configured to output the drive signal and a reference signal;
a mirror position calculator configured to generate a mirror position signal indicating a position of the first mirror based on the second light reception signal and the reference signal;
a measurement light intensity calculator configured to generate a waveform representing intensities of the first light reception signal at respective positions of the first mirror based on the first light reception signal and the mirror position signal; and
a Fourier transformer configured to perform Fourier transform on the waveform to acquire spectral information.

14. The spectrometer according to claim 13, wherein
the optical modulator includes a vibrator configured to vibrate based on the drive signal, and adds the second modulation signal by the vibrator vibrating and reflecting the laser light, and
the signal generator includes an oscillation circuit configured to operate using the vibrator as a signal source.

15. A spectrometer, comprising:
the optical device according to claim 3;
a signal generator configured to output the drive signal and a reference signal;
a mirror position calculator configured to generate a mirror position signal indicating a position of the first mirror based on the second light reception signal and the reference signal;
a measurement light intensity calculator configured to generate a waveform representing intensities of the first light reception signal at respective positions of the first mirror based on the first light reception signal and the mirror position signal; and
a Fourier transformer configured to perform Fourier transform on the waveform to acquire spectral information.

16. The spectrometer according to claim 15, wherein
the optical modulator includes a vibrator configured to vibrate based on the drive signal, and adds the second modulation signal by the vibrator vibrating and reflecting the laser light, and
the signal generator includes an oscillation circuit configured to operate using the vibrator as a signal source.

17. A spectrometer, comprising:
the optical device according to claim 4;
a signal generator configured to output the drive signal and a reference signal;
a mirror position calculator configured to generate a mirror position signal indicating a position of the first mirror based on the second light reception signal and the reference signal;
a measurement light intensity calculator configured to generate a waveform representing intensities of the first light reception signal at respective positions of the first mirror based on the first light reception signal and the mirror position signal; and
a Fourier transformer configured to perform Fourier transform on the waveform to acquire spectral information.

18. The spectrometer according to claim 17, wherein
the optical modulator includes a vibrator configured to vibrate based on the drive signal, and adds the second modulation signal by the vibrator vibrating and reflecting the laser light, and
the signal generator includes an oscillation circuit configured to operate using the vibrator as a signal source.

* * * * *